US009842075B1

(12) United States Patent
Davis et al.

(10) Patent No.: US 9,842,075 B1
(45) Date of Patent: Dec. 12, 2017

(54) PRESENTING MULTIPLE ENDPOINTS FROM AN ENHANCED PCI EXPRESS ENDPOINT DEVICE

(71) Applicant: Amazon Technologies, Inc., Reno, NV (US)

(72) Inventors: Mark Bradley Davis, Austin, TX (US); Anthony Nicholas Liguori, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 722 days.

(21) Appl. No.: 14/485,473

(22) Filed: Sep. 12, 2014

(51) Int. Cl.
*G06F 9/455* (2006.01)
*G06F 13/38* (2006.01)
*G06F 13/10* (2006.01)

(52) U.S. Cl.
CPC .......... *G06F 13/385* (2013.01); *G06F 13/105* (2013.01)

(58) Field of Classification Search
CPC .................................................... G06F 13/385
USPC .......................................................... 703/23
See application file for complete search history.

(56) References Cited

U.S. PATENT DOCUMENTS

| 7,743,197 | B2 * | 6/2010 | Chavan | G06F 13/4022 709/250 |
| 7,983,888 | B2 * | 7/2011 | Evoy | G06F 13/4022 703/14 |
| 2008/0005297 | A1 | 1/2008 | Kjos et al. | |
| 2009/0006708 | A1 * | 1/2009 | Lim | G06F 13/4022 710/314 |
| 2009/0043921 | A1 | 2/2009 | Roy | |
| 2012/0284446 | A1 | 11/2012 | Biran et al. | |

OTHER PUBLICATIONS

U.S. Appl. No. 14/489,453, filed Sep. 17, 2014, Mark Bradley Davis.
U.S. Appl. No. 14/470,874, filed Aug. 27, 2014, Anthony Nicholas Liguori.
"Usbredir From Spice" accessed Jun. 25, 2014, pp. 1-2.

* cited by examiner

*Primary Examiner* — Timothy A Mudrick
(74) *Attorney, Agent, or Firm* — Robert C. Kowert; Meyertons, Hood, Kivlin, Kowert & Goetzel, P.C.

(57) ABSTRACT

A system that provides virtualized computing resources to clients or subscribers may include an enhanced PCIe endpoint device on which an emulation processor emulates PCIe compliant hardware devices in software. In response to receiving a transaction layer packet that includes a transaction directed to an emulated device, the endpoint device may process the transaction, which may include emulating the target emulated device. The endpoint device may include multiple PCIe controllers and may expose multiple PCIe endpoints to a host computing system. For example, each PCIe controller may be physically coupled to one of multiple host processor sockets or host server SOCs on the host computing system, each of which exposes its own root complex. Traffic received by the PCIe controllers may be merged on the endpoint device for subsequent processing. Traffic originating at one host processor socket may be steered to the PCIe controller to which it is directly attached.

20 Claims, 15 Drawing Sheets

PRESENTING MULTIPLE ENDPOINTS FROM AN ENHANCED PCI EXPRESS ENDPOINT DEVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Today, a common way to implement virtualization for peripheral devices is to run a process in a virtual machine (or hypervisor) on the main server cores of the system on which other virtual machines are running on behalf of guests. The process traps all of the accesses to the virtual hardware for the peripheral devices and then emulates those devices in software. In some cases, with this approach, the software that is responsible for emulating the peripheral devices can sometimes cause jitter and variability in performance for the guests that are running on the same machine. In addition, for an infrastructure provider that implements this approach, the processing capacity of the processor cores that are running the emulation software is not available for sale or lease to customers.

Many peripheral devices are compliant to the PCI Express (Peripheral Component Interconnect Express) bus standard. PCI Express (also referred to as PCIe) is a high-speed serial computer expansion bus standard, some versions of which support hardware I/O virtualization. In general, a PCIe bus supports full-duplex communication between any two endpoints, with data encapsulated in packets. Traditionally a PCIe endpoint presents a single PCIe interface to the host. Typically, when the PCIe endpoint is connected to a multi-socket host server, it is physically connected to only one of the processor sockets (e.g., through one PCIe expansion slot). In this case, the socket that is not directly connected to the PCIe endpoint must relay PCIe traffic to the PCIe endpoint through the socket that is directly connected to the PCIe endpoint socket. This can increase latency and jitter (e.g., non-determinism of latency) due to the dynamic queuing effects of various links and buffers in the relay path.

Figure 1:
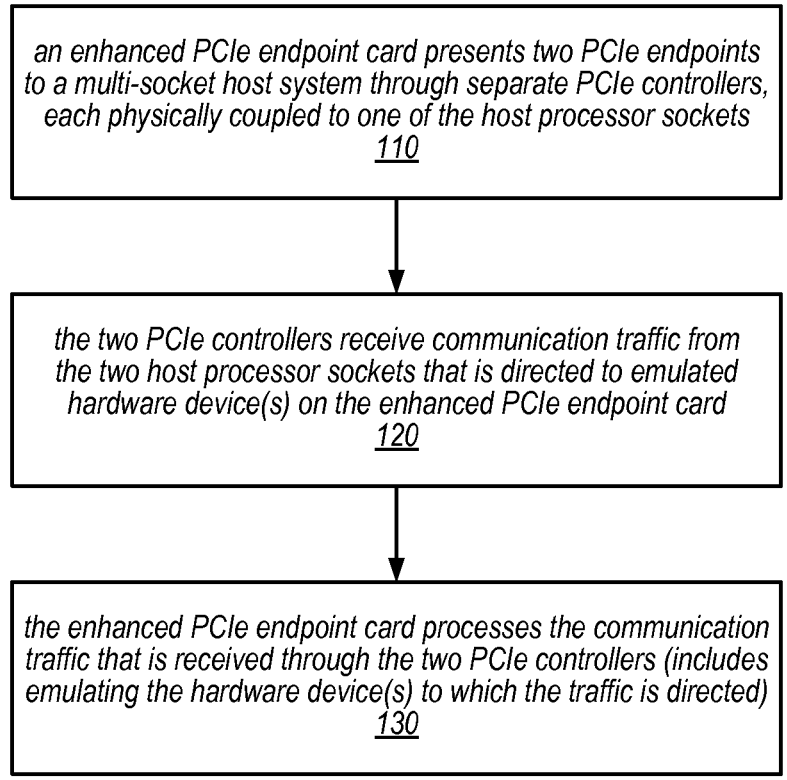
FIG. 1 is a flow diagram illustrating one embodiment of a method for presenting and utilizing multiple endpoints on an enhanced PCIe endpoint device.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A system that provides virtualized computing resources may include enhanced endpoint devices on which local endpoint emulation processors emulate hardware devices (e.g., PCIe compliant hardware) in software. In various embodiments, the enhanced endpoint devices may support both PCIe and Ethernet as the interconnect to a host computing system (e.g., to processor sockets or single-chip servers on the host computing system). For example, the enhanced endpoint devices may present themselves as SR-IOV enabled PCIe endpoints, and the hardware architecture of the enhanced endpoint devices and the techniques described herein may allow multi-threaded software to emulate any type of single root I/O virtualization (SR-IOV) PCIe device, with hardware acceleration, and compliant with PCIe ordering rules.

In some embodiments, in response to receiving a transaction layer packet from a host computing system that includes a transaction directed to an emulated hardware device (or a virtual or physical function thereof), an enhanced endpoint device may process the transaction, which may include emulating the target emulated device. In some embodiments, each of the enhanced endpoint devices described herein may include a single PCIe controller and may present itself as a single PCIe endpoint to a host computing system. In other embodiments, the endpoint devices may include multiple PCIe controllers (e.g., two or more) and may expose multiple PCIe endpoints (e.g., two or more) to host computing systems through separate PCIe lanes. For example, each of two or more PCIe controllers may be physically coupled to one of multiple host processor sockets or single-chip servers on the host computing system, each of which exposes its own root complex. This may benefit the host computing system by reducing the latency and jittering experienced in some existing systems in which all PCIe traffic must be routed through a single host processor and PCIe connection. Note that, as used herein, the term "socket" may be used to refer to an integrated circuit device that has been inserted in a mechanical component that is mounted (e.g., soldered) on a printed circuit board and that provides mechanical and electrical connections between the integrated circuit device and the printed circuit board, or may refer to an integrated circuit device that is mounted (e.g., soldered) directly on a printed circuit board, in different embodiments.

Traffic received from a host computing system by multiple PCIe controllers may be merged on the endpoint device for subsequent processing. Traffic originating at one host processor socket may be automatically or preferentially steered to the PCIe controller to which it is directly connected or may be routed through another host processor socket that is connected to the PCIe controller responsible for managing traffic directed to the target emulated device, in different embodiments. The techniques described herein for providing multiple PCIe endpoints to multiple host processors may be implemented without requiring compliance with the PCIe Multi-Root I/O Virtualization (MR-IOV) specification, which has not achieved industry acceptance.

One embodiment of a method for presenting and utilizing multiple endpoints on an enhanced PCIe endpoint device is illustrated by the flow diagram in FIG. 1. As illustrated at 110, in this example, the method may include an enhanced PCIe endpoint card presenting two PCIe endpoints to a multi-socket host system through separate PCIe controllers, each physically coupled to one of the host processor sockets. In this example, each host processor socket may include a single core processor or a multi-core processor, and each socket may present its own root complex. Note that in other embodiments, the enhanced PCIe endpoint card may present more than two PCIe endpoints to a multi-socket host system through separate PCIe controllers, each physically coupled to a different host processor socket.

As illustrated in this example, the method may include the two PCIe controllers receiving communication traffic (e.g., PCIe traffic) from the two host processor sockets that is directed to one or more emulated hardware device(s) (e.g., PCIe devices) on the enhanced PCIe endpoint card, as in 120. The method may also include the enhanced PCIe endpoint card processing the communication traffic that is received through the two PCIe controllers, which may include emulating the hardware device(s) to which the received communication traffic is directed (as in 130).

In some embodiments, the enhanced PCIe endpoint devices described herein may include host interface circuitry that implements pointer registers and control and status registers for each of multiple transaction ring buffers instantiated in memory on the device. In response to receiving a transaction layer packet that includes a transaction, packet steering circuitry on the endpoint device may push the transaction into a particular one of the buffers, dependent on the transaction type, a routing identifier for an emulated hardware device to which it is directed, its traffic class, and/or other transaction-related parameter values. Subsequently, the transaction may be processed in software (e.g., software executing on an emulation processor on the enhanced PCIe endpoint device), which emulates the targeted hardware device. In some embodiments, the host interface circuitry may generate response completion packets for configuration requests and non-posted transactions, and may return them according to PCIe ordering rules, regardless of the order in which they were processed on the endpoint device.

In some embodiments, the systems described herein (e.g., systems that provide virtualized computing and/or storage resources to clients) may use a processor that is not part of the main CPU complex (e.g., the CPU complex that executes virtual machines on behalf of guests) to perform the emulation of PCIe compliant hardware devices (or physical and/or virtual functions thereof). For example, an enhanced PCIe endpoint device may be a PCIe card on which is built an interface that facilitates the emulation of hardware devices using what is essentially a PCI pass-through to connect virtual machine guests directly over the PCI bus to the PCIe card, on which the emulation software is running In some embodiments the enhanced PCIe endpoint devices described herein may be programmed to emulate multiple devices of the same type or of different types simultaneously.

The PCIe device emulation approach described herein may allow a wide-range of device controllers to be emulated in software on the device. This approach may allow service providers to create virtual devices (a.k.a. self-virtualizing devices), i.e., full virtual device controllers in software, which may eliminate any requirement for instantiating every potentially interesting device controller in the PCIe endpoint device. In some embodiments, the enhanced PCIe endpoint devices described herein may provide a hardware architecture that enables a high-performance, flexible platform for SR-IOV device emulations.

In some embodiments, the enhanced PCIe endpoint devices described herein may implement the following functions and features:
  Provide an enhanced PCIe endpoint that presents multiple PCIe physical functions (PFs), and a large number of virtual functions (VFs) per PF.
  Present a SR-IOV target interface to the compute host that allows for optimized software implementation of fungible devices. The enhanced PCIe endpoint devices described herein may support at least 4096 virtual functions (VFs) that are presented as fungible devices. In various embodiments, these devices may support efficient implementation of any or all of the following personality types, as well as others not listed below:
    NVMe
    Virtio-net-pci
    VGA
    Super I/O, including all of the legacy platform devices such as four UARTs, the PCKBD controller, the RTC, a firmware configuration interface, the Programmable Interval Timer (PIT), and an I/O APIC.
    USB xHCI Controller
    Management function
  Provide hardware response for configuration requests.
  Provide ability for software to intercept both posted and non-posted transactions to allow for device emulation.
  Provide ability for multiple threads to participate in device emulation, allowing software to complete transactions in-order or out-of-order, and a hardware mechanism to enforce PCIe ordering rules for completion responses.
  Facilitate hypervisor/kernel bypass to allow host's guests to directly interact with the emulated devices.

Most existing PCIe endpoint cards on the market implement the actual PCIe controllers as hardware controllers on the card. The enhanced PCIe endpoint cards described herein may instead include a hardware infrastructure that enables high-speed emulation of devices, while the actual controllers are implemented as software emulations (as opposed to being implemented in dedicated hardware on the card). In other words, this approach may provide a hardware interface that facilitates the accelerated emulation of arbitrary PCI devices in order to reap the benefits of off-loading emulation onto a separate hardware card (thus freeing up main CPU capacity), while also providing the flexibility that comes along with software virtualization).

As described in more detail below, an enhanced PCIe endpoint may include a host interface module that is implemented largely (or entirely) in a hardware module (e.g., in host interface circuitry). In some embodiments, the host interface module may include multiple transaction ring buffers (e.g., circular queues) into which transactions directed to the endpoint (or to emulated hardware devices or physical and/or virtual functions thereof) are placed upon receipt and from which the transactions may be retrieved for processing on the endpoint (e.g., by a local processor, or processor core thereof, that executes emulation code for various hardware devices).

Figure 2:
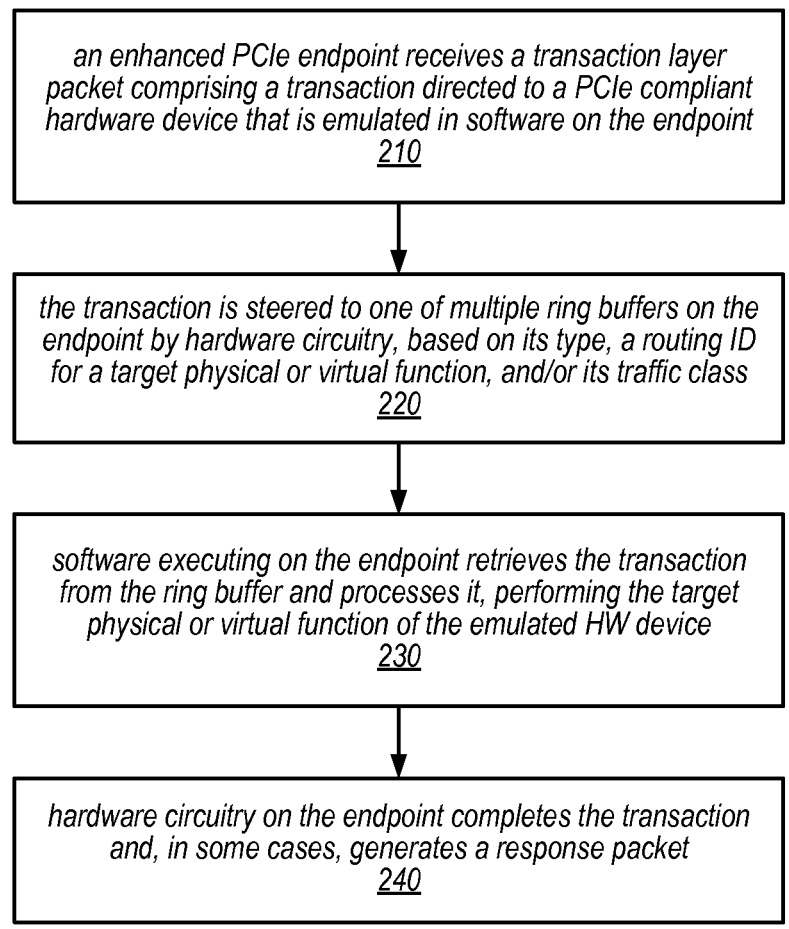
FIG. 2 is a flow diagram illustrating one embodiment of a method for using an enhanced PCIe endpoint device to emulate a PCIe compliant hardware device.

One embodiment of a method for using an enhanced PCIe endpoint device to emulate a PCIe compliant hardware device is illustrated by the flow diagram in FIG. 2. As illustrated at 210, in this example, the method may include an enhanced PCIe endpoint (e.g., a host interface module or host interface circuitry of the endpoint) receiving a transaction layer packet comprising a transaction directed to a PCIe compliant hardware device that is emulated in software on the endpoint. Note that in some embodiments, the emulated hardware device may be one of multiple hardware devices emulated in software on the endpoint. As illustrated in this example, the method may include steering the transaction to one of multiple ring buffers on the endpoint (e.g., circular buffers that are instantiated in memory on the endpoint) by hardware circuitry, based on the transaction type, a routing ID for a target physical or virtual function, the traffic class for the transaction, and/or other transaction-related parameter values, as in 220.

As illustrated in FIG. 2, the method may include software executing on the endpoint retrieving the transaction from the ring buffer and processing it, which may include performing the target physical or virtual function of the emulated hardware device, as in 230. The method may also include hardware circuitry on the endpoint completing the transaction and, in some cases, generating a completion response packet, as in 240.

Figure 3:
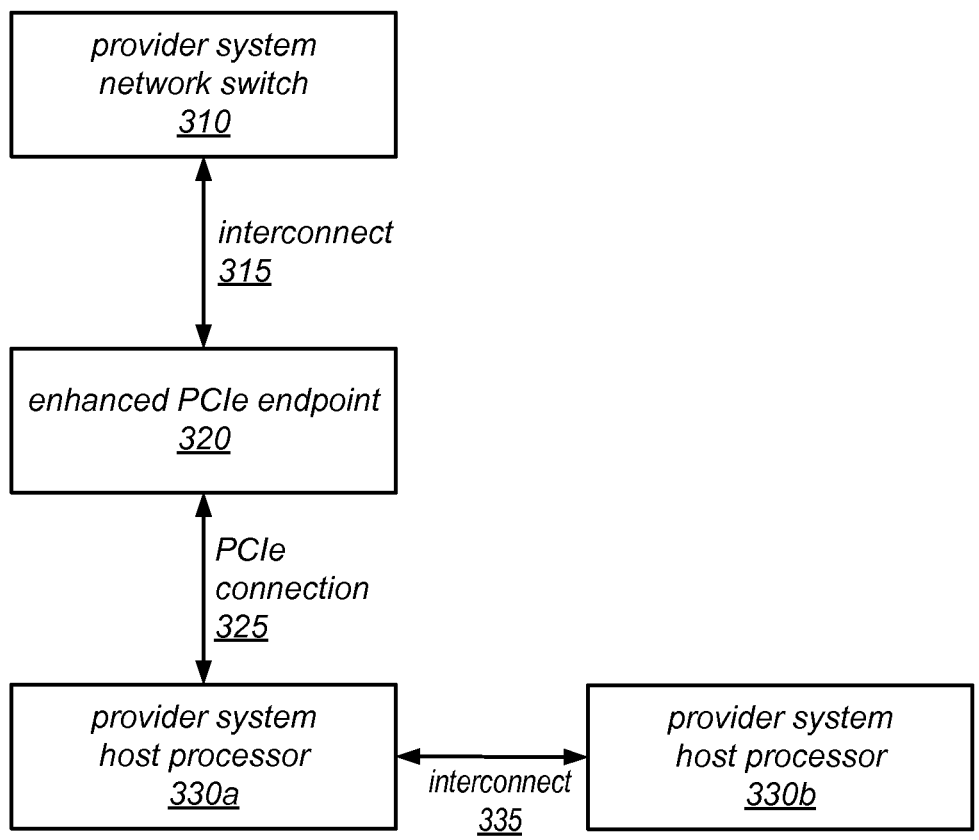
FIG. 3 is a block diagram illustrating the relationships between an enhanced PCIe endpoint in a service provider system, the host processors of the service provider system, and a service provider network switch, according to at least one embodiment.

FIG. 3 is a block diagram illustrating the relationships between an enhanced PCIe endpoint in a service provider system, the host processors of the service provider system, and a service provider network switch, according to one embodiment. In this example, a provider system network switch 310 is coupled to an enhanced PCIe endpoint 320 (e.g., a PCIe card in a data center of a service provider that provides virtualized computing and storage services) over an interconnect 315 (e.g., an Ethernet connection). The enhanced PCIe endpoint 320 is coupled to provider system host processor 330*a* (e.g., one of multiple main server processors or motherboard processors in the service provider system) over a PCIe connection 325. In this example, provider system host processor 330*a* is coupled to provider system host processor 330*b* over interconnect 335 (e.g., a coherent point-to-point processor interconnect) and may route communication traffic to provider system host processor 330*b*. In some embodiments, these connections may provide NUMA access characteristics for memory and I/O. In this example, one processor socket (provider system host processor 330*a*) is directly connected to the PCIe interface of enhanced PCIe endpoint 320. The second processor socket (provider system host processor 330*b*) has to relay PCIe traffic through interconnect 335, routing it through provider system host processor 330*a*, which can create non-uniform latency characteristics between the two host processors. In other embodiments, including those illustrated in FIGS. 5, 6A, 6B, and 8, and described herein, the enhanced PCIe endpoint 320 may have the ability to support PCIe interfaces to both provider system host processors to minimize latency and jitter effects of relaying the traffic directed to provider system host processor 330b through provider system host processor 330a. In some embodiments, the provider system network switch 310 may serve to connect the enhanced PCIe endpoint 320 (or a network interface thereof) to other networks (e.g., to the public Internet or to an intermediate network) and/or to other networked devices in the provider's data center (e.g., to the next level data center routers that, eventually, connect together all of the other servers, or racks thereof, in the data center).

In some embodiments, the PCIe connection 325 between enhanced PCIe endpoint 320 and provider system host processor 330a may be a third generation PCIe interface (e.g., a PCIe Gen3 x4, x8, or 16 interface, depending upon bandwidth, cost, and/or power considerations) and the PCIe controller for enhanced PCIe endpoint 320 may be a dual-mode (root complex and endpoint) controller. In some embodiments, enhanced PCIe endpoint 320 (and/or its host interface) may be configured to be software extensible such that a wide range of different devices and physical functions thereof may be realized in software.

In existing single root I/O virtualization (SR-IOV) PCIe devices, there is typically a dedicated hardware controller (e.g., one implemented in an integrated circuit device) for each different physical function, and the SR-IOV allows multiple guests to share the controller for a physical function (which is fixed in hardware). By contrast, the enhanced PCIe endpoint cards described herein may include an embedded processor core on the PCI card that emulates those different physical function controllers in software running on that processor core.

PCIe Conceptual Model

In some embodiments, the functional organization of the enhanced PCIe endpoint cards described herein may be similar to that of other SR-IOV PCIe devices. For example, they may implement multiple different physical functions, and with each physical function there may be multiple different virtual functions (e.g., there may be three virtual functions for a given physical function).

In some embodiments, an enhanced PCIe endpoint card, such as those described herein, may be implemented according to the following conceptual model:

The endpoint may present itself as an SR-IOV Multi-PF capable endpoint.

The endpoint may perform address translation (ATC/ATS) the between PCIe addresses and local memory addresses of the endpoint.

Each emulated device may present itself as a single physical function, and as a software-defined number of virtual functions In general, a DMA engine may be instantiated for each device class for which emulation is supported in order to increase isolation between emulated device classes The endpoint may instantiate twice the number of DMA engines than the number of device families that are expected, in order to optimize for incoming/outgoing transactions In some embodiments, the enhanced PCIe endpoint cards described herein may support the PCI SR-IOV functions but the actual function of the piece of silicon may vary. For example, one day it might be programmed to implement a VGA adapter, on another day it may be reprogrammed to implement a USB device, and on yet another day, it may be reprogrammed for Ethernet. In some embodiments, a wide range of such devices may all be emulated at once on a single card. In some such embodiments, it may appear as if the card includes a large number of different types of controllers that are built into the card at the same time. Note that in some embodiments, there may be a fixed maximum number of physical functions that can be emulated on the enhanced PCIe endpoint card at the same time (e.g., 256). Each of the functions (e.g., a USB function, a VGA function, an Ethernet function, etc.) may be called by software, and an SR-IOV may operate on top of each of those functions. In some embodiments, a PCI switch or PCI bridge that is implemented within this card (e.g., one implemented either in hardware or software) may be used to expand the number of available functions beyond 256. Note that, in this example, each of the SR-IOV virtual functions may still need to be the same type as a particular physical function. Note also that the same hierarchy for the virtual functions of a particular physical function defined for all SR-IOV devices may be implemented in the enhanced PCIe endpoint cards described herein.

SR-IOV Support

In embodiments of the enhanced PCIe endpoints that provide SR-IOV support, the following functions and features may be supported:

Each virtual function may share a number of common configuration space fields with the physical function; i.e., where the fields are applicable to all virtual functions and controlled through a single physical function.

Each function, physical function, and virtual function may be assigned a unique Routing ID. The Routing ID (RID) for each virtual function may be determined using the Routing ID of its associated physical function and fields in that physical function's SR-IOV Capability.

Each physical function may be assigned zero or more virtual functions. The number of virtual functions per physical function is not required to be identical for all physical functions within the device.

Each physical function may represent a different device type.

Using the Alternative Routing Identifier (ARI) capability, a device may support up to 256 physical functions, and may be sparse throughout the 256 Function Number space.

SR-IOV Devices may consume more than one Bus Number. A virtual function may be associated with any Bus Number within the device's Bus Number range, which includes the captured Bus Number plus any additional Bus Numbers that are configured by software.

The use of multiple Bus Numbers may enable a device to support a very large number of virtual functions, e.g., up to the size of the Routing ID space minus the bits used to identify intervening busses.

PCIe Transaction Processing

An enhanced PCIe endpoint card may present itself as a native PCIe endpoint that is presenting a configuration header type 0. The enhanced PCIe endpoint card may receive and process transactions of different types, as described below.

PCIe Request Types

Host interface transaction processing of incoming transactions received by the enhanced PCIe endpoint card may be divided into three categories:

Configuration requests, non-posted read/write (type 0 and type 1)

Non-posted request types
Memory read, memory read lock, IO read, IO write

Posted request types

Memory write, message

In some embodiments, for non-posted requests, a requestor may send a packet to the enhanced PCIe endpoint card for which a completer should generate a response in the form of a completion response packet. Note that even I/O and configuration writes may be non-posted, e.g., in order to confirm that the write data has in fact made it to the destination without error. For posted requests, the targeted devices may not return a completion transaction layer packet (TLP) to the requestor. In some embodiments, configuration commands (e.g., configuration cycles) may be processed completely in hardware, with no software intervention. Other types of transactions (or commands/cycles) may be pushed into transaction ring buffers that are being managed in hardware and from which they may be retrieved (e.g., pulled out of a circular queue) for processing.

Quality of Service (QoS)/Traffic Class (TC) Support

PCIe supports QoS policies and agreements by setting a 3-bit field within each packet called the Traffic Class (TC). A higher numbered TC is expected to give a higher priority to the packet. In some embodiments, multiple buffers, a.k.a. virtual channels (VCs) may be allocated for each TC so that packets can flow through each VC without being backed up behind packets with TCs that indicate a lower priority.

Transaction Ordering

Within a VC, packets may normally flow through the VC in the same order in which they arrived, with some exceptions. However, it may be understood by software that there is no ordering relationship between different TCs. The PCIe specification describes a transaction ordering model that must be maintained (e.g., defining when reads pass reads, writes pass reads, writes pass writes, etc., for different types of transactions). In embodiments in which an enhanced PCIe endpoint supports multithreaded emulation, the enhanced PCIe endpoint may include a hardware mechanism to maintain the transaction ordering semantics, so that regardless of the order in which multiple threads of the emulation process transactions, PCIe compliant transaction ordering semantics are maintained.

In one example, different tiers of multiple cores or multiple threads may all pull transactions off the same queue (e.g., off of the same transaction ring buffer). The queue may include transactions specifying various read, write, and configuration commands, and the different cores (or threads thereof) may all perform work on those transactions simultaneously. In some embodiments, any completion response packets generated for transactions that are processed simultaneously or out of order may be manipulated by the host interface circuitry to enforce compliance with the ordering rules. Note that in some embodiments, the transaction ordering requirements may be enforced separately within the context of each physical function (e.g., the ordering may be independent from one physical function to the next). As described herein, the enhanced PCIe endpoint may include a set of transaction ring buffers (queues) for the different types of transactions, and may include separate transaction ring buffers for the different virtual channels/traffic classes for each of those transaction types. In some embodiments, circuitry within the enhanced PCIe endpoint may be configured to keep up with the order in which incoming transactions are received. For example, the circuitry may include one or more timers that timestamp the transactions when they are received so that the order in which they are received is known. Subsequently, some additional hardware circuitry (e.g., logic circuitry) may be configured to implement the PCIe ordering rules in order to enforce them. The implementation of the PCIe transaction ordering rules in the enhanced PCIe endpoint may contribute to enhanced performance because they may allow transactions to go around other transactions that were received earlier but that are stalled. In addition, the implementation of the PCIe transaction ordering rules in the enhanced PCIe endpoint may allow the system to avoid deadlocks.

As described in more detail below, any arbitrary number of hardware-managed ring buffers may be instantiated in memory on an enhanced PCIe endpoint, and a hardware steering mechanism may include a software-definable mapping of various transaction-related parameter values (e.g., tuples of addresses, routing identifiers and transaction classes, or other combinations of parameter values) to specific transaction ring buffers. For example, in some embodiments, software may be configured to create a mapping table to map each of multiple combinations of transaction-related parameter values to a specific transaction ring buffer. In such embodiments, for each incoming transaction layer packet, the hardware steering mechanism may steer the transaction to a specific ring buffer, which may then add the transaction into its circular queue.

Figure 4:
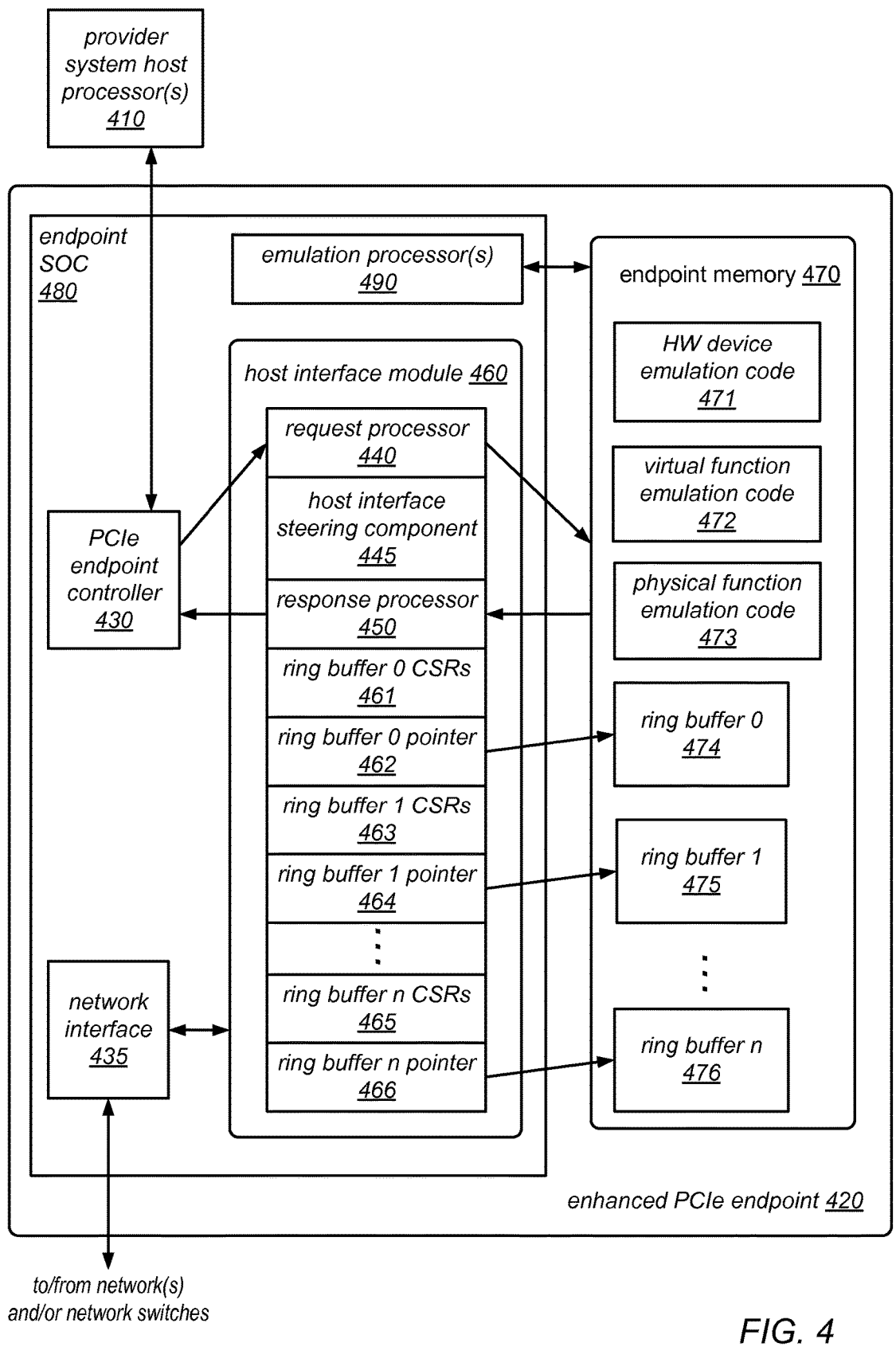
FIG. 4 is a block diagram illustrating an enhanced PCIe endpoint device, according to at least one embodiment.

One embodiment of an enhanced PCIe endpoint (e.g., a PCIe endpoint device on which the hardware is configured to support accelerated multi-device emulation) is illustrated by the block diagram in FIG. 4. In this example, enhanced PCIe endpoint 420 communicates with one or more provider system host processors 410 over a PCIe compliant interface. Enhanced PCIe endpoint 420 includes a PCIe endpoint controller 430, host interface module 460, which is implemented as a hardware module (e.g., host interface circuitry) and which includes a request processor 440, a host interface steering component 445, and a response processor 450. In this example, transaction layer packets (TLPs) are exchanged between PCIe endpoint controller 430 and request processor 440, and between PCIe endpoint controller 430 and response processor 450. In some embodiments, after the incoming TLPs are processed by request processor 440, bus read or write transactions that were included in the TLPs (and any associated data or transaction parameters) may be passed from request processor 440 to particular ones of the ring buffers 474-476 in endpoint memory 470, after which responses to those transactions (if any) may be returned to response processor 450. As illustrated in this example, enhanced PCIe endpoint 420 may also include a network interface 435, through which enhanced PCIe endpoint 420 and its components (e.g., the components that make up endpoint SOC 480) communicate with other networks (e.g., the public Internet or an intermediate network) and/or with other networked devices in a provider's data center (e.g., through various network switches).

In the example illustrated in FIG. 4, host interface module 460 also includes, for each of multiple transaction ring buffers, a control and status register (CSR) and a pointer register. These are illustrated in FIG. 4 as ring buffer CSRs 461, 463, and 465, and as ring buffer pointers 462, 464, and 466. In this example, enhanced PCIe endpoint 420 also includes one or more endpoint emulation processor(s) 490 (e.g., one or more single core or multi-core processors, some of which may be configured to execute multithreaded applications). As illustrated in this example, in some embodiments, PCIe endpoint controller 430, host interface module 460, emulation processor(s) 490, and network interface 435 may be implemented as components of a single system-on-chip (SOC) device (shown as endpoint SOC 480) on enhanced PCIe endpoint 420.

In this example, enhanced PCIe endpoint 420 includes endpoint memory 470 (which may, in some embodiments, be implemented as DRAM). In this example, enhanced PCIe endpoint 420 has instantiated within memory 470 multiple transaction ring buffers. For example, ring buffers 0-n are shown as elements 474-476 in FIG. 4. In other embodiments, these transaction ring buffers may be instantiated in memory on the endpoint SOC (e.g., in SRAM) rather than in endpoint memory 470. In the example illustrated in FIG. 4, endpoint memory 470 is also configured to store emulation code for one or more PCIe compliant hardware devices (and/or for the physical and/or virtual functions thereof). This is illustrated in FIG. 4 as HW device emulation code 471, virtual function emulation code 472, and physical function emulation code 473. In other embodiments, any or all of this emulation code may be stored in memory on the endpoint SOC 480, rather than in a separate endpoint memory 470, or endpoint memory 470 (including transaction ring buffers 474-476, device emulation code 471, virtual function emulation code 472, and physical function emulation code 473) may be included in endpoint SOC 480. As described in more detail below, in some embodiments, enhanced PCIe endpoint 420 may include a physical or virtual PCI switch (not shown), which may allow the endpoint to provide a large number of emulated devices and functions within multiple sets of such emulated devices and functions.

As noted above, in an another embodiment, enhanced PCIe endpoint 420 may include a physical or virtual PCI switch and multiple host interface modules 460, each of which may include components similar to those illustrated in host interface module 460 in FIG. 4, and may implement functionality similar to that of host interface module 460 in FIG. 4. In some embodiments, each of the host interface modules 460 may include hardware circuitry (e.g., control and status registers and/or pointer register) for managing a respective collection of transaction ring buffers (e.g., ring buffers that store transactions directed to different emulated hardware devices or functions thereof). In some such embodiments, endpoint memory 470 may store emulation code for all of the hardware devices and virtual/physical functions thereof that are supported by all of the host interface modules 460. In other embodiments, the emulation code for different hardware devices or functions may be distributed among multiple separate memories or among multiple partitions of endpoint memory 470 (not shown). Similarly, in some embodiments, endpoint memory 470 may store all of the transaction ring buffers that are managed by all of the host interface modules 460. However, in other embodiments, the transaction ring buffers may be distributed among multiple separate memories or among multiple partitions of endpoint memory 470 (not shown). In some embodiments, the PCIe switch may be configured to select a particular one of the host interface modules 460 to which incoming TLPs are routed, dependent, at least in part, on the emulated hardware device or virtual/physical function thereof to which the transaction is directed. Note that the enhanced PCIe endpoint devices and endpoint SOCs thereof that are illustrated in FIG. 4 and described above are merely examples of the many different ways that an enhanced PCIe endpoint device and endpoint SOC may be architected, in different embodiments.

Host Interface Transaction Ring Buffer Processing

In some embodiments, the use of the transaction ring buffers and the hardware packet steering mechanism described herein may allow enhanced PCIe endpoints to handle all the different physical functions and virtual functions that are targeted by incoming transactions and to divide and queue the transactions up in different ones of the transaction ring buffers in different ways dependent, at least in part, on the transaction types and/or the traffic classes of the transactions.

As previously noted, the host interface module of the enhanced PCIe endpoints described herein may have the ability to define a number of transaction ring buffers. In one embodiment, the host interface module may include the following function and features:

A steering mechanism may be provided that allows for software to define a mapping from some combination of [address, RID, TC] to a specific transaction ring buffer.
  Ring buffers may be managed with head and tail pointers.
  Each entry of the ring buffer may contain core TLP data, which may include transaction information and transaction processing information, which may include any or all of the following:
    Transaction information:
      Header information:
        Transaction type
        Target address
        Routing ID (RID)
        Requester ID
        Transfer size (if any), byte enables
        Attributes
        Traffic class
      Data
    Transaction processing information:
      Timestamp data
      Transaction valid bit
      Transaction completion doorbell In different embodiments, the packet steering mechanism may consider a variety of criteria (e.g., any transaction-related parameter values or combination of transaction-related parameter values) when determining the particular transaction ring buffers to which individual TLPs should be steered. For example, in some embodiments, ingress memory mapped IO (MMIO) packets (e.g., packets accessing PCIe device base address registers, or BAR space) may be translated and steered to particular transaction ring buffers by the steering mechanism. In some embodiments, the translation and steering mechanism may be configured by software that is executed by a processor on the enhanced PCIe endpoint device (e.g., by the emulation processor). In some embodiments, each of the MMIO packets may first go through a translation based on the address in the packet to target a particular resource on the enhanced PCIe endpoint, such as:

Physical addresses on the enhanced PCIe endpoint, including DRAM and I/O space
  CPU packet queues (e.g., transaction ring buffers) on the enhanced PCIe endpoint
  A data mover component (e.g., a DMA controller)

In some embodiments, targeting physical addresses on the enhanced PCIe endpoint may allow for:

Directly mapping DRAM on the enhanced PCIe endpoint to MMIO space, which may enable features such as firmware upload.
  Directly mapping IO peripherals of the enhanced PCIe endpoint (e.g., Ethernet, or a serial bus interface, such as SATA) to MMIO space, which may enable direct host control of IO peripherals of the enhanced PCIe endpoint.

In some embodiments, targeting particular transaction ring buffers may allow for queuing up packets that need to be processed by a processor on the enhanced PCIe endpoint device (e.g., by the emulation processor). Architecturally, the enhanced PCIe endpoint may support an arbitrary number of ring buffers (queues), but in practice, it may be common to have at least one per emulation processor core. As noted above, steering logic may map packets to particular ring buffers (queues) based on the packet address. The steering logic may send groups of addresses to the same processor core. This mechanism may be used, for example, to send all packets targeting the same virtual function(s) to the same processor core, or to send certain addresses from all virtual function(s) (e.g., doorbells) to the same processor core. In some embodiments, the steering addressing may be set up as address match/mask pairs. In such embodiments, there is a match if:

(match_address & match_mask)==(packet_address & match_mask)

In some embodiments, the address match can optionally be extended to be the tuple [address, traffic class], e.g., in order to factor in quality of service when performing packet steering. As noted above, reads and writes that are destined to the same processor core may be placed in a single transaction ring buffer (queue) to maintain overall ordering. In some embodiments, if a packet does not match an address in the steering logic, the packet may be mapped to a particular ring buffer (queue) using a default function. In some such embodiments, the default function may apply one of the following three approaches:

Hash—A hash function may be set up to map addresses to transaction ring buffers (queues). The hashes may be based on the upper address bits so that packets for the same virtual function(s) map to the same ring buffer (queue).

Round-robin—Packets may be assigned to ring buffers (queues) in a round robin fashion.

Default—All packets may be routed to a single default queue.

In some embodiments of the enhanced PCIe endpoint cards described herein, both read transactions and write transactions may be pushed into the same transaction ring buffer so that software sees the global ordering of the received transactions (per TC). As described in more detail herein, the enhanced PCIe endpoint cards may implement or support two transaction completion mechanisms, as follows:

A software synchronous model in which software is notified of a transaction, performs any desired processing, and writes a transaction doorbell indicating completion of the transaction.

A notification model for posted and configuration transactions in which software gets notified of the transaction.

In various embodiments, the enhanced PCIe endpoint cards described herein may include, for each ring buffer:

control and status registers (CSRs) for head, tail pointers a CSR bit indicating whether an interrupt should be issued when a transaction is posted. The interrupt may be generated via an interrupt controller (to allow programmable steering to set of CPUs).

a CSR bit indicating whether Configuration Read transactions should be pushed into this ring buffer.

a CSR bit indicating whether Configuration Write transactions should be pushed into this ring buffer.

a CSR bit indicating whether posted transactions should be pushed into this ring buffer as a Notification.

a CSR bit indicating whether posted transactions should be pushed into this ring buffer as a Software Synchronous Transaction.

In some embodiments, although much of the functionality of the endpoint is implemented in hardware, the enhanced PCIe endpoint cards described herein may be configured using software (e.g., by one or more configuration modules executing on the endpoint). For example, in some embodiments, emulation code (such as HW device emulation code 471, virtual function emulation code 472, and/or physical function emulation code 473 illustrated in FIG. 4) may be written into the memory on an enhanced PCIe endpoint card (such as endpoint memory 470 on enhanced PCIe endpoint 420) by software executing on the endpoint itself or on a host server to which it is connected in order to initialize the enhanced PCIe endpoint for subsequent emulation of various hardware devices and virtual or physical functions thereof, e.g., by the execution of this code by a processor on the enhanced PCIe endpoint (such as emulation processor 490 within the endpoint SOC). Note that, in some embodiments, after initially writing emulation code into the endpoint memory, the endpoint may be subsequently reconfigured to support the emulation of more, fewer, or different functions by writing additional code into the endpoint memory, deleting code from the endpoint memory, or overwriting the code in the endpoint memory.

In another example, software may be used to initialize (and/or subsequently reconfigure) the functionality of the hardware on the enhanced PCIe endpoint. For example, software executing on the endpoint itself or on a host server to which it is connected may be configured to instantiate multiple transaction ring buffers in memory on the endpoint (e.g., in memory within the endpoint SOC or in a separate endpoint memory), and may also be configured to write initial values into the pointer registers and the control and status registers for those ring buffers in order to configure and manage them.

As noted above, in some embodiments of the enhanced PCIe endpoint cards described herein, both read transactions and write transactions may be pushed into the same transaction ring buffer so that software sees the global ordering of the received transactions. As noted above, the transaction ring buffers may be implemented in hardware. For example, they may be instantiated in physical memory on the enhanced PCIe endpoint card, such as in a DRAM that serves as the operating memory for an emulation processor core on the endpoint card. Note that the number of transaction ring buffers that are (or that can be) instantiated on an enhanced PCIe endpoint card may be somewhat arbitrary, as there may not be a fixed relationship between transaction ring buffers and physical functions or virtual functions, and there may not be any fixed constraints on the number of transaction ring buffers.

In addition to serving as buffers for all the transactions that are received, the transaction ring buffers may also serve as a mechanism for maintaining the read/write ordering of the incoming transactions. As described herein, a hardware packet steering mechanism may have the ability to separate out incoming transactions by their traffic classes so that the lower priority transactions cannot block higher priority transactions. In some embodiments, there may be multiple different ring buffers for storing transactions in (respective) different traffic classes, and they may be separated out and steered to the different ring buffers according to a software-definable mapping. In other words, when the software is designed, the programmer may determine the mapping that is needed between some combination of routing IDs, addresses, and traffic classes and the transaction ring buffers, and may determine the number of different transaction ring buffers to instantiate in the memory on the enhanced PCIe endpoint card, depending on the type of device(s) being emulated or other factors. In one example, the number of transaction ring buffers may be equal to the number of processor cores on the endpoint card (e.g., the number of cores in the emulation processor on the endpoint card), such as 4, 8, or 16. As previously noted, each transaction ring buffer has its own control and status register (CSR), in some embodiments.

Configuration Transaction Processing

In some embodiments, only the root complex (e.g., a host server processor) may be permitted to originate configuration requests, and these requests may only move downstream. These requests may be routed based on the target device's ID (e.g., its BDF, which comprises: its Bus number in the topology, its Device number on the bus, and the Function number within the device).

In some embodiments, the enhanced PCIe endpoint card may present itself as a type 0 extended configuration space. This configuration space may include 4096 bytes per function. In some embodiments, the host interface of the enhanced PCIe endpoint card may provide the following transaction processing functions and features for configuration transactions:

- The endpoint card may provide a mechanism to map a 4K "proxy" configuration workspace per BDF.
- For non-posted configuration read transactions:
  - The endpoint card may build and return a completion packet by reading the data from the corresponding proxy configuration workspace. Software may have pre-populated this proxy configuration workspace with the desired data.
  - Optionally (as determined by a CSR bit), the endpoint card may push a Configuration Read notification record to the corresponding host interface processing ring buffer.
- For non-posted configuration write transactions:
  - The endpoint card may write the configuration data to the corresponding proxy configuration workspace.
  - The endpoint card may build and return a completion packet indicating the successful configuration write.
  - Optionally (as determined by CSR bit), the endpoint card may push a Configuration Write notification record to the corresponding host interface processing ring buffer.

Host Software Synchronous Transactions

In some embodiments, the enhanced PCIe endpoint cards described herein may support software synchronous transactions, which require completion responses. In such embodiments, any incoming transaction that has been pushed into a transaction ring buffer as a software synchronous transaction may need to be marked as completed by software writing to the corresponding event doorbell for that transaction. Generally, software may either poll or be notified that there is a transaction to process. Software may then perform any emulation processing required to process the transaction, and may use one of two techniques to complete the transaction, after which point the completion response packets (return messages) may be generated by hardware on the enhanced PCIe endpoint card. The two completion techniques may be described as follows:

1. The software may write the address of the completion response packet into that transaction entry doorbell. In one example, there are multiple cores (or even a single core) processing multiple transactions retrieved off of a single queue, and three transactions (commands) have come into the transaction ring buffer that they are working on. If two of the three (e.g., the bottom two) have been processed (e.g., emulated), one way to indicate that the transactions are ready to be completed may be to update the tail pointer for the transaction ring buffer by two to tell the hardware that it can now complete two of the three transactions.
2. The software may update the ring buffer tail pointer to indicate that the oldest transaction is to be completed. In embodiments that apply this approach, doorbells may be marked individually in each transaction (command), such that the transactions may be processed out of order (from a software perspective). The hardware may be configured to detect that the transactions were processed out of order (e.g., based on timestamps and or other information) and to manipulate the return of the completion response packets for those transactions to enforce PCIe transaction ordering rules. The hardware may also be configured to update the tail pointer for the transaction ring buffer.

In some embodiments, the host interface hardware module (e.g., host interface circuitry) of an enhanced PCIe endpoint card may be configured to complete transactions as follows:

- If the doorbell is written for the transaction at the tail pointer or if the tail pointer is updated by software, the completion response for that transaction may be sent to the host and the tail pointer may be updated.
- If the doorbell is written for a transaction that is not at the tail pointer, hardware may enforce the PCIe ordering rules to determine when to send the completion response for that transaction, and may mark that transaction with a Software Completed/Pending Completion Message.

In some embodiments, having support for two different ways of handling synchronous transactions may provide more flexibility for the software to perform transactions out of order. For example, multiple transactions may be completed just by manipulating the tail pointer to indicate the number of transactions that have been completed in software, or the transactions may be marked as complete individually, even if they are not pointed to by the tail pointer. In some embodiments, the hardware may maintain an association with the tail pointer, as well as the order of the completion responses to be sent back to the requester to maintain PCIe ordering. The selection of the technique that software uses in completing transactions may be up to the programmer who writes an application or an emulator driver, and one approach may potentially be better for one driver and the other way may be better for other drivers. In general, the mechanisms described herein may provide the emulation processor of an enhanced PCIe endpoint the flexibility to process transactions in any order, while relying on circuitry in the host interface module to maintain PCIe ordering rules when subsequently returning any required (or optional) completion response packets.

The techniques described herein for using an enhanced PCIe endpoint to emulate PCIe compliant hardware devices may provide an accelerated and more flexible emulation approach when compared to existing virtualization approaches. In some embodiments, the hardware architecture described herein may enable a high-performance, flexible platform for SR-IOV device emulations, allowing PCIe compliant devices to be emulated in system software. For example, these techniques may be used to provide the following features and functionality:

- Multi-threaded out of order synchronous software completion, while maintaining PCIe transaction ordering rules
- Hardware completion of configuration reads/writes for software emulation Data structures/processing for hardware facilitation of software emulation Methods for supporting emulation for multiple devices, physical functions, and virtual functions, as well as multiple traffic classes Support for both a software notification model and a software emulation model As previously noted, in some embodiments, the enhanced PCIe endpoints described herein may be configurable (e.g., programmable) and reconfigurable (e.g., reprogrammable) using software (e.g., one or mode configuration modules that run on the enhanced PCIe endpoints. In some such embodiments, after receiving and processing requests directed to the PCIe compliant hardware devices that the endpoint is initially configured to emulate, if a request to change the functionality of the endpoint is received, this software may reconfigure the enhanced PCIe endpoint card to emulate more, fewer, or different PCIe compliant hardware devices and physical/virtual functions thereof, after which the enhanced PCIe endpoint card may receive multiple transaction layer packets directed to hardware devices and physical/virtual functions that are emulated on the reconfigured endpoint and may process them, as appropriate. For example, in some embodiments, the software may be configured to reprogram the enhanced PCIe endpoint card in response to a request from a subscriber for a change in a virtualized computing system that is provided for their use, or in response to a request for resource instances for a virtualized computing system for the use of a different service subscriber. In various embodiments, in addition (or instead of) using software to change the number or type of PCIe compliant hardware devices and physical/virtual functions thereof that can be emulated by the endpoint card (e.g., by loading emulation code for more, fewer, or different hardware devices and physical/virtual functions into the memory on the endpoint card), software may be used to reconfigure the hardware of the enhanced PCIe endpoint card, such as by instantiating more transaction ring buffers or deallocating one or more transaction ring buffers, or by writing to various CSRs and/or pointer registers for one or more of the ring buffers.

As previously noted, in some embodiments, a PCI switch may be integrated on the enhanced PCIe endpoint card to allow the endpoint card to be able to support more physical functions. The PCI switch may be a physical PCI switch (e.g., one implemented by circuitry on the endpoint card), or a virtual PCI switch (e.g., a switch emulated by software executing on the endpoint card), in different embodiments. In either case, it may appear to the rest of the system (e.g., to software executing in the system) as a PCI switch.

In embodiments in which a PCI switch is integrated on the enhanced PCIe endpoint card, the PCI switch may support the PCI hot-plug feature, allowing physical and/or virtual functions to be easily and dynamically introduced and/or removed. For example, in some embodiments, it may be desirable to be able to dynamically reconfigure the system, e.g., to add more virtual block devices, to reduce the number of virtual block devices, to increase the number of virtual network adapters, etc. In some embodiments that include an integrated PCI switch, when an emulated hardware device is brought up on the endpoint card, the host may see this as a hot-plug event, and may be configured to recognize and interact with that emulated hardware device in the same manner as it would if an equivalent hardware device were dynamically introduced into the system. In contrast, in systems that rely solely on SR-IOV as a way of virtualizing devices, there is not a flexible or robust mechanism for dynamically adding and/or removing virtual functions.

Note that while many examples included herein describe apparatus and techniques for accelerating the emulation of hardware devices that comply with the PCIe bus standard, in other embodiments, these techniques may be employed in other endpoint devices to emulate hardware devices that comply with another bus expansion interface standard (e.g., one that includes a multilayer transport protocol).

Multi-Channel Endpoint

As previously noted, when a single-channel PCIe endpoint is connected to a multi-socket host server (e.g., one on which multiple processors run a single operating system and provide a single cache coherent system), the single-channel PCIe endpoint is physically connected (using a single point-to-point serial PCIe connection) to only one of the processor sockets (e.g., through one PCIe expansion slot), and all of the processor sockets will see the same (single) root complex. In these systems, processes or threads running on all of the processor sockets see and access the PCIe endpoint socket as if it were locally attached, but there are latency differences between the sockets. In this case, the processor socket that is not directly connected to the PCIe endpoint relays PCIe traffic to the PCIe endpoint through the socket that is directly connected to the PCIe endpoint socket, which can increase latency and jitter due to the dynamic queuing effects of various links and buffers in the relay path. In these systems, there may be bottlenecks and/or communication traffic congestion at times, such that the latency is not fixed, but can vary significantly depending on the workload and traffic.

As illustrated in FIG. 1 and described above, in some embodiments, the enhanced PCIe endpoint devices described herein may include multiple PCIe controllers and may present multiple PCIe interfaces (endpoints) to the host computing system (e.g., to multiple processor sockets or host server SOCs, each of which presents its own root complex) over separate PCIe channels (lanes). In such embodiments, each of the processor sockets or host server SOCs is directly connected to one of the PCIe controllers so that traffic does not have to be proxied or switched through a single processor socket or host server SOC to access the enhanced multi-channel PCIe endpoint device (and/or any emulated hardware devices or functions implemented on the enhanced multi-channel PCIe endpoint device). In some such embodiments, software running on the host computing system may be optimized such that the processes or threads executing on each processor socket communicating with the local root complex. For example, NUMA aware software may preferentially route PCIe traffic from each processor socket or host server SOC to the PCIe interface that is directly (physically) connected to the processor socket. In some embodiments, each processor socket may have its own virtual Ethernet network interface card (NIC). The apparatus and techniques described herein may be extended to support any number of host processors (e.g., any number of processor sockets or host server SOCs), in different embodiments, connecting each to a separate PCIe endpoint presented by an enhanced multi-channel PCIe endpoint device.

Figure 5:
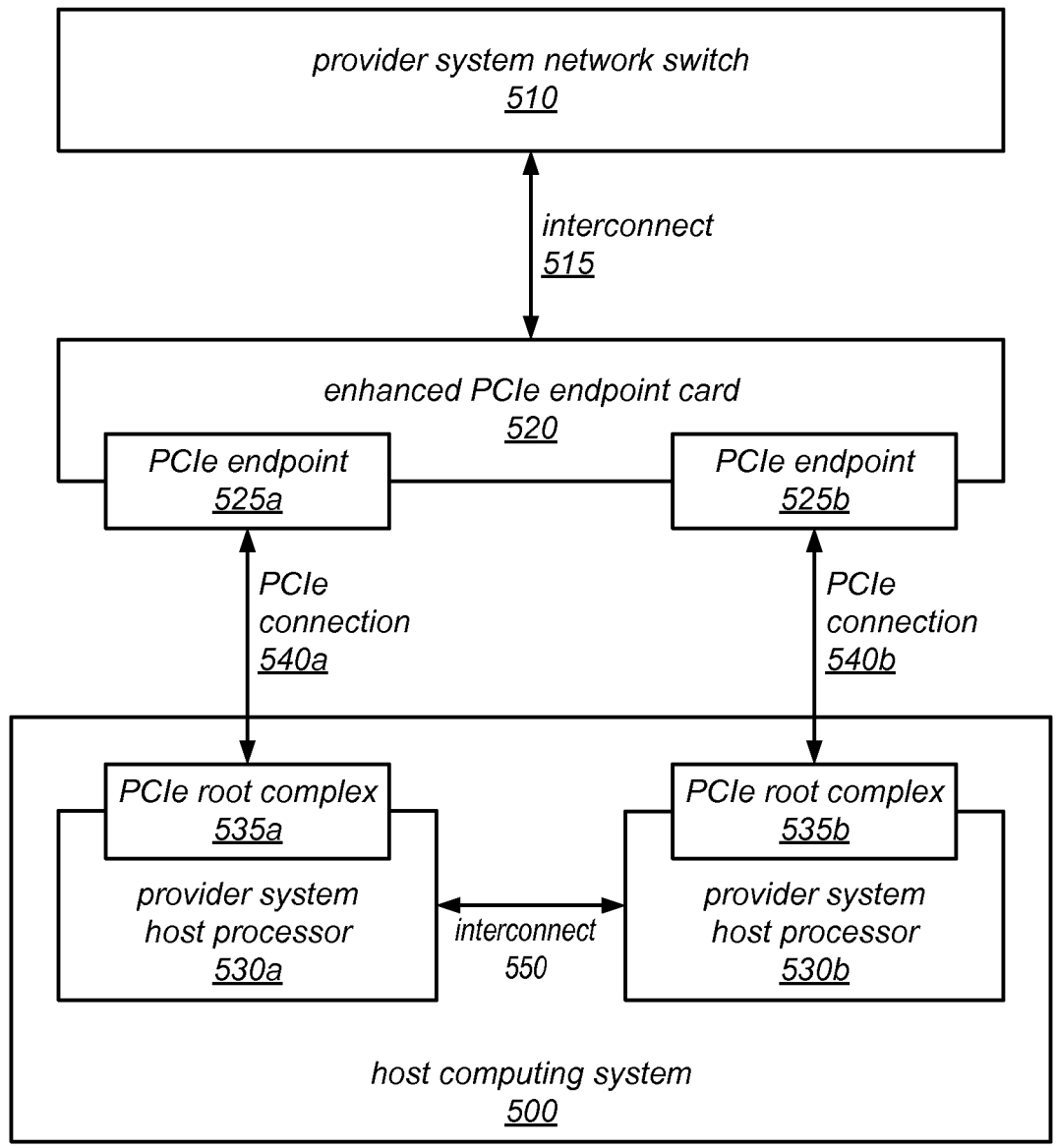
FIG. 5 is a block diagram illustrating the relationships between an enhanced PCIe endpoint in a service provider system, the host processors of the service provider system, and a service provider network switch, according to an embodiment in which the enhanced PCIe endpoint exposes multiple endpoints to the host processors.

FIG. 5 is a block diagram illustrating the relationships between an enhanced PCIe endpoint in a service provider system (in this case, one that exposes multiple endpoints to host processors), the host processors of the service provider system, and a service provider network switch, according to one embodiment. In other words, in the example embodiment illustrated in FIG. 5, the enhanced PCIe endpoint 520 may have the ability to expose PCIe interfaces to multiple provider system host processors to minimize latency and jitter effects of relaying the traffic directed to one provider system host processor through another provider system host processor. In this example, a provider system network switch 510 is coupled to an enhanced PCIe endpoint 520 (e.g., a PCIe card in a data center of a service provider that provides virtualized computing and storage services) over an interconnect 515 (e.g., an Ethernet connection). In this example, each of the two PCIe endpoints exposed by the enhanced PCIe endpoint card 520 (shown as PCIe endpoints 525*a* and 525*b*) is coupled to a respective provider system host processor 530*a* or 530*b* (e.g., one of multiple main server processors or motherboard processors in the service provider system, which is illustrated in FIG. 5 as host computing system 500). Again note that in other embodiments, the enhanced PCIe endpoint card may present any number of PCIe endpoints to a host system through separate PCIe controllers, each physically coupled to a different host processor or processor socket For example, in one embodiment, the enhanced PCIe endpoint card may present four PCIe endpoints to a host system that includes four processor sockets through four separate PCIe controllers.

In this example, each of the provider system host processors 530*a* and 530*b* presents its own PCIe root complex (shown as 535*a* and 535*b*, respectively). For example, provider system host processor 530*a* exposes PCIe root complex 535*a*, which is coupled to PCIe endpoint 525*a* over PCIe connection 540*a*, and provider system host processor 530*b* exposes PCIe root complex 535*b*, which is coupled to PCIe endpoint 525*b* over PCIe connection 540*b*. In this example, provider system host processor 530*a* is coupled to provider system host processor 530*b* over interconnect 550 (e.g., a point-to-point processor interconnect) and each of the provider system host processors may route communication traffic to the other provider system host processor.

In some embodiments, the provider system network switch 510 may serve to connect the enhanced PCIe endpoint 520 (or a network interface thereof) to other networks (e.g., to the public Internet or to an intermediate network) and/or to other networked devices in the provider's data center (e.g., to the next level data center routers that, eventually, connect together all of the other servers, or racks thereof, in the data center).

In some embodiments, the PCIe connections between the PCIe endpoints 525 on enhanced PCIe endpoint card 520 and the provider system host processors 530 on host computing system 500 may be third generation PCIe interfaces (e.g., PCIe Gen3 x4, x8, or 16 interfaces, depending upon bandwidth, cost, and/or power considerations) and the PCIe controllers on enhanced PCIe endpoint 520 may be dual-mode (root complex and endpoint) controllers. In some embodiments, enhanced PCIe endpoint 520 and/or its host interface(s) may be configured to be software extensible such that a wide range of different devices and physical functions thereof may be realized in software.

As noted above, in some embodiments, NUMA aware software may preferentially route PCIe traffic from each processor socket or host server SOC to the PCIe interface that is directly (physically) connected to the processor socket. For example, if the host computing system includes two processor sockets, P0 and P1, the processes running on P0 may communicate to the root complex out of the PCIe interface off of P0, and the processes running on P1 may communicate to the root complex out of the PCIe interface off of P1. In other words, since the processes may see two root complexes, the performance may be improved by making the software running on each socket NUMA aware (in this case, meaning that it knows which root complex is local and which one is remote), so that it can focus (e.g., preferentially route) its I/O traffic using the local root complex. In another example, if there is an emulated PCIe device that is attached to the PCIe controller that is directly connected to P0 via PCIe, and a process running on P1 exchanges communication traffic with the device, there may be a significant degradation in the I/O performance (e.g., in the number of I/O operations per second, or IOPS) because of the cost of delivering the PCIe transaction layer packets to and from P1 instead of to and from P0. In some embodiments, the operating system (or other NUMA aware software) may attempt to generate that communication traffic from P0 instead, in order to achieve an increase in IOPS. In such embodiments, by presenting two root complexes rather than driving all I/O traffic from a single socket, the I/O traffic may be distributed between multiple sockets, which may provide better I/O performance.

In some embodiments, the enhanced multi-channel PCIe endpoint devices and techniques described herein may be used to support a multi-tenant model in which each tenant runs its processes on one of the host processor sockets of a host computing system, and the I/O traffic for each of those tenant processes is routed to a particular one of the PCIe controllers on an enhanced multi-channel PCIe endpoint device through its local root complex and over its own PCIe channel (its own physical PCIe lanes). Unlike in systems in which all I/O traffic is routed through a single socket and root complex, in some embodiments, these techniques may allow the system to offer the same I/O performance for all of its tenants, regardless of the processor socket(s) on which their processes run.

Note that because multiple different root complexes are presented to the PCIe controllers on the enhanced multi-channel PCIe endpoint device, it may appear to the enhanced multi-channel PCIe endpoint device as if it is receiving PCIe communication traffic from multiple completely different host computing systems or host servers. The hardware and software of the enhanced multi-channel PCIe endpoint device may be configured to process incoming transactions that are received from these host computing systems or host servers by the multiple PCIe controllers. For example, in some embodiments, multiplexing logic on the enhanced multi-channel PCIe endpoint device (e.g., in a hardware or software multiplexer component) may merge the incoming PCIe traffic for subsequent processing on the enhanced multi-channel PCIe endpoint device, using any of the techniques described herein for enqueuing and processing the transactions that are included in the received PCIe traffic. Note that, at some point, data and/or commands that were received by the enhanced multi-channel PCIe endpoint device may be routed off the device (e.g., to a hardware device whose controller is emulated on the enhanced multi-channel PCIe endpoint device) through one or more network interfaces.

Figure 6A:
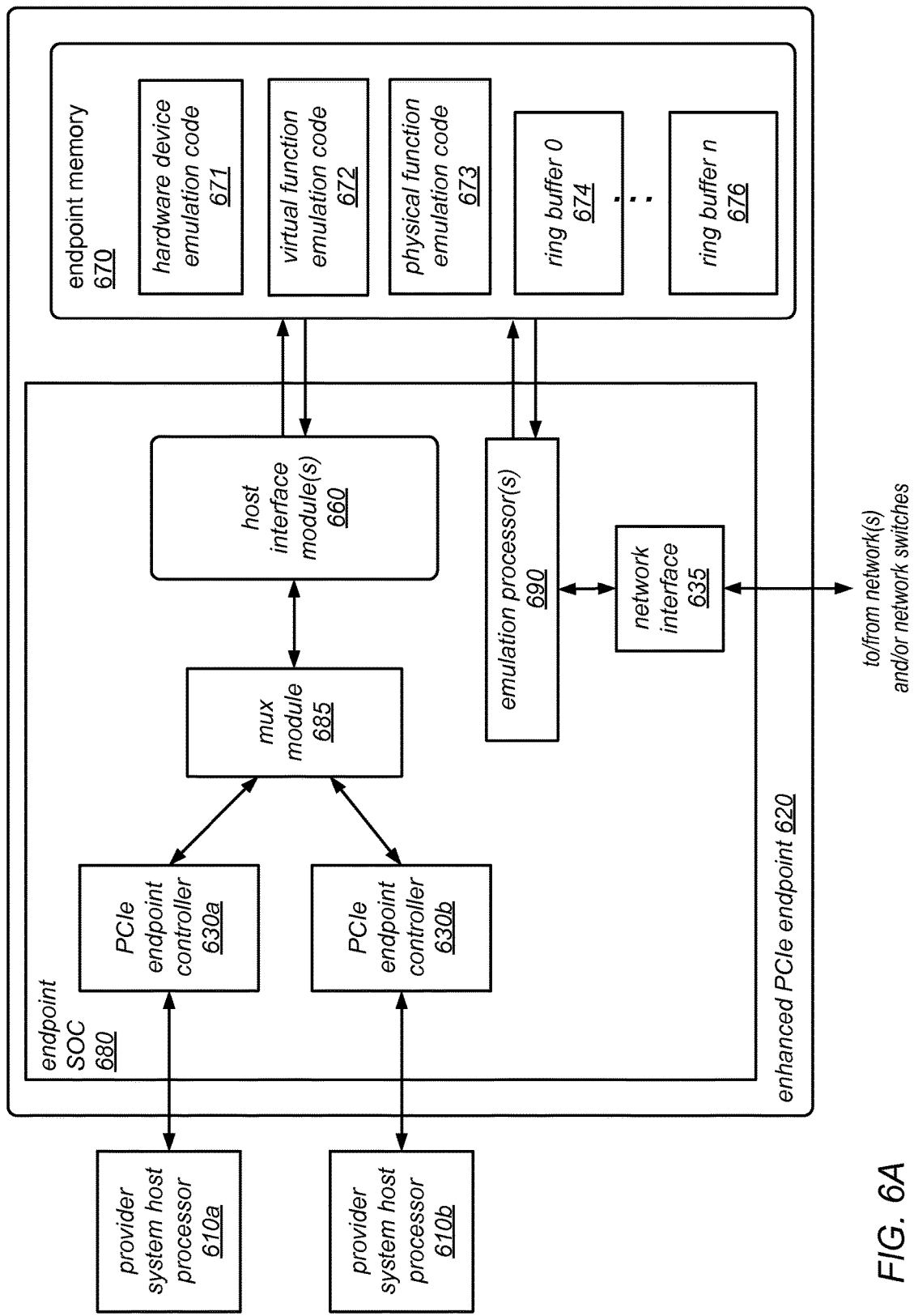
FIGS. 6A and 6B are block diagrams illustrating example embodiments of an enhanced PCIe endpoint device that presents multiple endpoints to host processors.

One embodiment of an enhanced PCIe endpoint 620 (e.g., a multi-channel PCIe endpoint device on which the hardware is configured to support accelerated multi-device emulation and that presents multiple endpoints to host processors) is illustrated by the block diagram in FIG. 6A. In this example, enhanced PCIe endpoint 620 includes one or more host interface modules 660, each of which may include components similar to those illustrated in host interface module 460 in FIG. 4 (or other host interface modules described herein) and may implement functionality similar to that of host interface module 460 in FIG. 4 (or other host interface modules described herein). In some embodiments, each of the host interface modules 660 may include hardware circuitry (e.g., control and status registers and/or pointer register) for managing a respective collection of transaction ring buffers (such as ring buffers 674-676 shown in FIG. 6A) that store transactions directed to different emulated hardware devices or functions thereof). In some such embodiments, endpoint memory 670 may store emulation code for all of the hardware devices and virtual/physical functions thereof that are supported by all of the host interface modules 660. This is illustrated in FIG. 6A as hardware device emulation code 671, virtual function emulation code 672, and physical function emulation code 673 within endpoint memory 670. In other embodiments, the emulation code for different hardware devices or functions may be distributed among multiple separate memories or among multiple partitions of endpoint memory 670 (not shown). Similarly, in some embodiments, endpoint memory 670 may store all of the transaction ring buffers that are managed by all of the host interface modules 660. However, in other embodiments, the transaction ring buffers may be distributed among multiple separate memories or among multiple partitions of endpoint memory 670 (not shown).

As illustrated in this example, enhanced PCIe endpoint 620 includes multiple PCIe endpoint controllers (shown as PCIe endpoint controller 630a and 630b), which communicate with respective ones of multiple provider system host processors (shown as provide system host processors 610a and 610b) over a respective PCIe compliant interface. In the example embodiment illustrated in FIG. 6A, enhanced PCIe endpoint 620 includes a multiplexer module 685, which may be configured to merge incoming transaction layer packets that are received by PCIe endpoint controllers 630a and 630b for subsequent processing on enhanced PCIe endpoint 620 and/or to separate and route any response packets back to the appropriate PCIe endpoint controllers 630, through which they are to be returned to the corresponding host processor 610.

As in the host interface module 460 described above, each of the host interface module(s) 660 illustrated in FIG. 6A, which are implemented as hardware modules (e.g., host interface circuitry) may also include a request processor, a host interface steering component, and a response processor (not shown). In this example, transaction layer packets (TLPs) are exchanged between PCIe endpoint controllers 630 and multiplexer module 685, between multiplexer module 685 and various request processors within the host interface modules 660, and between multiplexer module 685 and various response processors within the host interface modules 660. In some embodiments, after each of the incoming TLPs is processed by one of the request processors, bus read or write transactions that were included in the TLPs (and any associated data or transaction parameters) may be passed from the request processor to a particular one of the ring buffers 674-676 in endpoint memory 670, after which responses to those transactions (if any) may be returned to one of the response processors within host interface modules 660.

As illustrated in this example, enhanced PCIe endpoint 620 may also include a network interface 635, through which enhanced PCIe endpoint 620 and its components (e.g., the components that make up endpoint SOC 680) communicate with other networks (e.g., the public Internet or an intermediate network) and/or with other networked devices in a provider's data center (e.g., through various network switches). In the example illustrated in FIG. 6A, enhanced PCIe endpoint 620 also includes one or more endpoint emulation processor(s) 690 (e.g., one or more single core or multi-core processors, some of which may be configured to execute multithreaded applications). As illustrated in this example, in some embodiments, the PCIe endpoint controllers 630, host interface module(s) 660, emulation processor(s) 690, and network interface 635 may be implemented as components of a single system-on-chip (SOC) device (shown as endpoint SOC 680) on enhanced PCIe endpoint 620.

In this example, enhanced PCIe endpoint 620 includes endpoint memory 670 (which may, in some embodiments, be implemented as DRAM). In this example, enhanced PCIe endpoint 620 has instantiated within memory 670 multiple transaction ring buffers. For example, ring buffers 0-n are shown as elements 674-676 in FIG. 6A. In other embodiments, these transaction ring buffers may be instantiated in memory on the endpoint SOC (e.g., in SRAM) rather than in endpoint memory 670. As noted above, endpoint memory 670 may also configured to store emulation code for one or more PCIe compliant hardware devices (and/or for the physical and/or virtual functions thereof). This is illustrated in FIG. 6A as hardware device emulation code 671, virtual function emulation code 672, and physical function emulation code 673.

In some embodiments, enhanced PCIe endpoint 620 may include a physical or virtual PCI switch (not shown), which may allow the endpoint to provide a large number of emulated devices and functions within multiple sets of such emulated devices and functions. In such embodiments, enhanced PCIe endpoint 620 may include multiple host interface modules 660, each of which may include components similar to those illustrated in host interface module 460 in FIG. 4, and may implement functionality similar to that of host interface module 460 in FIG. 4. In some such embodiments, endpoint memory 670 may store emulation code for all of the hardware devices and virtual/physical functions thereof that are supported by all of the host interface modules 660. In other embodiments, the emulation code for different hardware devices or functions may be distributed among multiple separate memories or among multiple partitions of endpoint memory 670 (not shown). Similarly, in some embodiments, endpoint memory 670 may store all of the transaction ring buffers that are managed by all of the host interface modules 660. However, in other embodiments, the transaction ring buffers may be distributed among multiple separate memories or among multiple partitions of endpoint memory 670 (not shown). In some embodiments, the PCIe switch may be configured to select a particular one of the host interface modules 660 to which incoming TLPs are routed, dependent, at least in part, on the emulated hardware device or virtual/physical function thereof to which the transaction is directed.

Figure 6B:
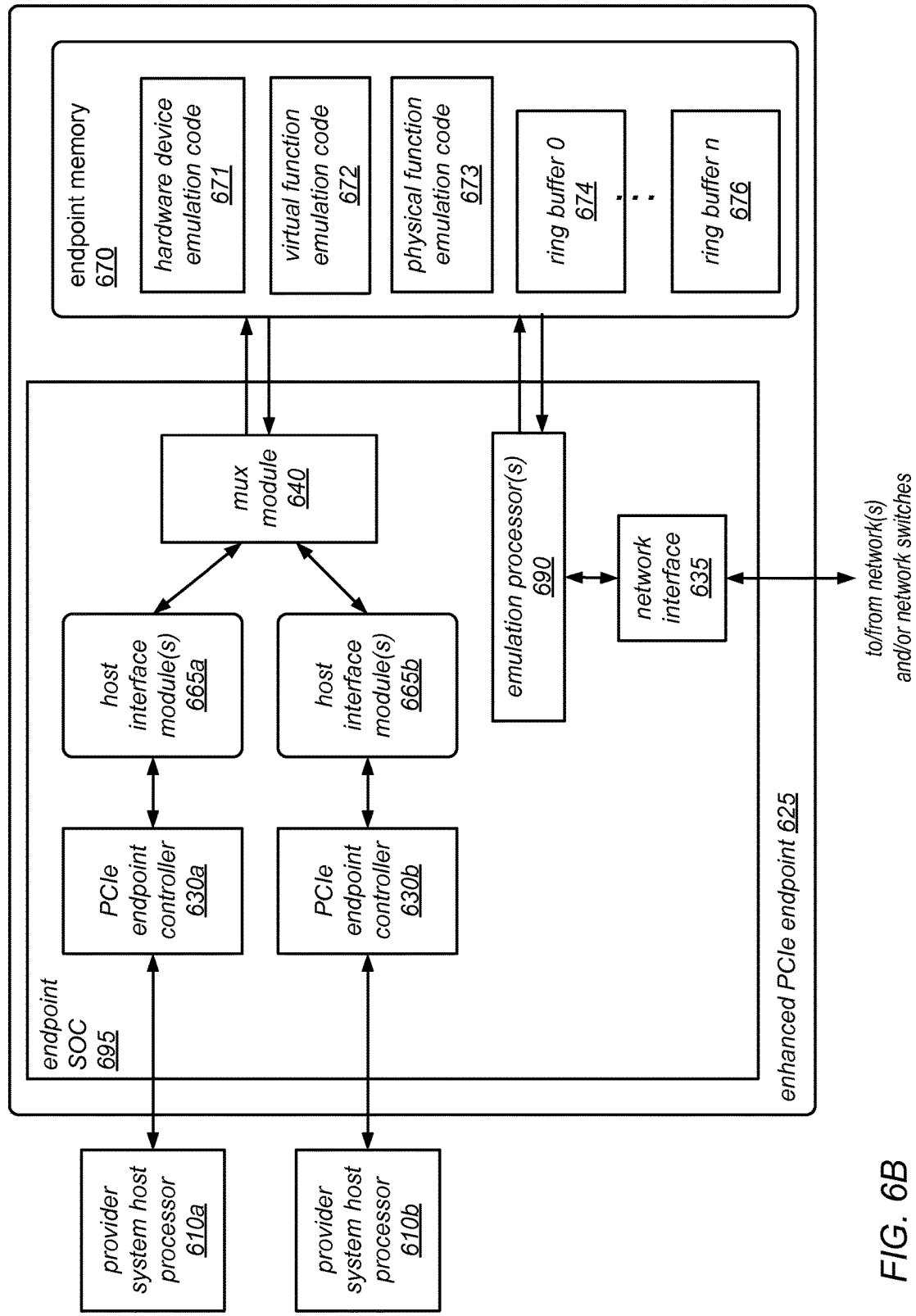

Another embodiment of an enhanced PCIe endpoint (e.g., a multi-channel PCIe endpoint device on which the hardware is configured to support accelerated multi-device emulation and that presents multiple endpoints to host processors) is illustrated by the block diagram in FIG. 6B. In this example, enhanced PCIe endpoint 625 includes two or more host interface modules 665 (shown as host interface modules 665a and 665b), each of which may include components similar to those illustrated in host interface module 460 in FIG. 4 (or other host interface modules described herein) and may implement functionality similar to that of host interface module 460 in FIG. 4 (or other host interface modules described herein). In this example, different ones of the host interface modules 665 are configured to receive communication traffic from respective ones of the PCIe endpoint controllers 630. In some embodiments, each of the host interface modules 665 may include hardware circuitry (e.g., control and status registers and/or pointer register) for managing a respective collection of transaction ring buffers (such as ring buffers 674-676 shown in FIG. 6B) that store transactions directed to different emulated hardware devices or functions thereof. In some such embodiments, endpoint memory 670 may store emulation code for all of the hardware devices and virtual/physical functions thereof that are supported by all of the host interface modules 665. This is illustrated in FIG. 6B as hardware device emulation code 671, virtual function emulation code 672, and physical function emulation code 673 within endpoint memory 670. In other embodiments, the emulation code for different hardware devices or functions may be distributed among multiple separate memories or among multiple partitions of endpoint memory 670 (not shown). Similarly, in some embodiments, endpoint memory 670 may store all of the transaction ring buffers that are managed by all of the host interface modules 665. However, in other embodiments, the transaction ring buffers may be distributed among multiple separate memories or among multiple partitions of endpoint memory 670 (not shown).

As illustrated in this example, enhanced PCIe endpoint 625 includes multiple PCIe endpoint controllers (shown as PCIe endpoint controller 630*a* and 630*b*), which communicate with respective ones of multiple provider system host processors (shown as provider system host processors 610*a* and 610*b*) over a respective PCIe compliant interface. In the example embodiment illustrated in FIG. 6B, enhanced PCIe endpoint 625 includes a multiplexer module 640, which may be configured to merge transaction layer packets that are communicated from host interface modules 665 to endpoint memory 670 during subsequent processing on enhanced PCIe endpoint 625 and/or to separate and route any response packets back to the appropriate ones of the host interface modules 665 (and PCIe endpoint controllers 630), through which they are to be returned to the corresponding host processor 610. For example, in response to one of the PCIe endpoint controllers 630 receiving communication traffic from a corresponding provider system host processor 610, the PCIe endpoint controller 630 may route that communication traffic (e.g., as transaction layer packets) to one of the host interface modules 665 for processing, and the host interface modules 665 may then pass the resulting communication traffic (e.g., as transaction layer packets) to the multiplexer module 640. In the example illustrated in FIG. 6B, communication traffic from the two host interface modules 665 to the endpoint memory may then be merged by the multiplexer module 640 before being communicated to the endpoint memory 670. Subsequent to the received transactions being processed, the multiplexer module 640 may separate any communication returned from the processing of the transactions and direct it to the host interface module 665 that is coupled to the PCIe endpoint controller 630 through which the corresponding transaction was received from one of the provider system host processors 610.

As in the host interface module 460 described above, each of the host interface module(s) 665 illustrated in FIG. 6B, which are implemented as hardware modules (e.g., host interface circuitry) may also include a request processor, a host interface steering component, and a response processor (not shown). In this example, transaction layer packets (TLPs) are exchanged between PCIe endpoint controllers 630 and various request processors within the host interface modules 665, between various request processors within the host interface modules 665 and multiplexer module 640, between multiplexer module 640 and various response processors within the host interface modules 665, and between various response processors within the host interface modules 665 and PCIe endpoint controllers 630. In some embodiments, after each of the incoming TLPs is processed by one of the request processors, bus read or write transactions that were included in the TLPs (and any associated data or transaction parameters) may be passed from the request processor to a particular one of the ring buffers 674-676 in endpoint memory 670, after which responses to those transactions (if any) may be returned to one of the response processors within host interface modules 665.

As illustrated in this example, enhanced PCIe endpoint 625 may also include a network interface 635, through which enhanced PCIe endpoint 625 and its components (e.g., the components that make up endpoint SOC 695) communicate with other networks (e.g., the public Internet or an intermediate network) and/or with other networked devices in a provider's data center (e.g., through various network switches). In the example illustrated in FIG. 6B, enhanced PCIe endpoint 625 also includes one or more endpoint emulation processor(s) 690 (e.g., one or more single core or multi-core processors, some of which may be configured to execute multithreaded applications). As illustrated in this example, in some embodiments, the PCIe endpoint controllers 630, host interface module(s) 665, emulation processor(s) 690, and network interface 635 may be implemented as components of a single system-on-chip (SOC) device (shown as endpoint SOC 695) on enhanced PCIe endpoint 625.

In this example, enhanced PCIe endpoint 625 includes endpoint memory 670 (which may, in some embodiments, be implemented as DRAM). In this example, enhanced PCIe endpoint 625 has instantiated within memory 670 multiple transaction ring buffers. For example, ring buffers 0-n are shown as elements 674-676 in FIG. 6B. In other embodiments, these transaction ring buffers may be instantiated in memory on the endpoint SOC (e.g., in SRAM) rather than in endpoint memory 670. As noted above, endpoint memory 670 may also be configured to store emulation code for one or more PCIe compliant hardware devices (and/or for the physical and/or virtual functions thereof). This is illustrated in FIG. 6B as hardware device emulation code 671, virtual function emulation code 672, and physical function emulation code 673.

In some embodiments, enhanced PCIe endpoint 625 may include a physical or virtual PCI switch (not shown), which may allow the endpoint to provide a large number of emulated devices and functions within multiple sets of such emulated devices and functions. In such embodiments, enhanced PCIe endpoint 625 may include multiple host interface modules 665, each of which may include components similar to those illustrated in host interface module 460 in FIG. 4, and may implement functionality similar to that of host interface module 460 in FIG. 4. In some such embodiments, endpoint memory 670 may store emulation code for all of the hardware devices and virtual/physical functions thereof that are supported by all of the host interface modules 665. In other embodiments, the emulation code for different hardware devices or functions may be distributed among multiple separate memories or among multiple partitions of endpoint memory 670 (not shown). Similarly, in some embodiments, endpoint memory 670 may store all of the transaction ring buffers that are managed by all of the host interface modules 665. However, in other embodiments, the transaction ring buffers may be distributed among multiple separate memories or among multiple partitions of endpoint memory 670 (not shown). In some embodiments, the PCIe switch may be configured to select a particular one of the host interface modules 665 to which incoming TLPs are routed, dependent, at least in part, on the emulated hardware device or virtual/physical function thereof to which the transaction is directed. Note that while FIGS. 4, 6A, and 6B illustrate multiple architectures for the implementation of an enhanced PCIe endpoint device and an endpoint SOC thereof, the enhanced PCIe endpoint devices and endpoint SOCs thereof that are illustrated in FIGS. 4, 6A, and 6B, and described above, are merely examples of the many different ways that an enhanced PCIe endpoint device and endpoint SOC may be architected, in different embodiments.

In some embodiments, an enhanced PCIe endpoint device (such as those described herein) may be implemented as single physical device (e.g., a single PCIe card) that is logically or functionally equivalent to multiple PCIe controllers. For example, the enhanced PCIe endpoint device may manifest multiple independent PCIe controllers, and various hardware and/or software components may be configured to multiplex the PCIe traffic in order for system software or client applications (or various threads or other software processes thereof) to be able to operate across multiple PCIe controllers. Note that, in at least some embodiments, the multiple PCIe controllers do not share physical PCIe communication lanes when communicating with the host processors. Instead, there may be separate and independent PCIe channels established between each of the different independent PCIe controllers and the processor sockets to which they are physically connected. Note that in some embodiments each of the PCIe controllers may be physically connected to only one of the processor sockets (with this connection having its own lanes). In other embodiments, each of the separate and independent PCIe channels may be physically connected to all of the processor sockets (with each such point-to-point connection having its own lanes).

Note that the widths of the connection between each PCIe controller and a corresponding processor socket may be arbitrary. In some embodiments, it may be dependent on the bus width that the PCIe controllers support, the expected workload, the target performance, and/or the number of lanes that the hardware designer decides to express in the board design for the enhanced PCIe endpoint card and/or for the motherboard of the host computing system. For example, for a high bandwidth design, a PCIe x16 interface may be exposed to both sockets of a two-socket host computing system, with dedicated (private) lanes to each socket.

In some embodiments in which the enhanced multi-channel PCIe endpoint device include the multi-channel connection capabilities described herein, a given host computing system may not take advantage of these capabilities. For example, in some system designs (and/or at certain times), only one connection between a host processor and a PCIe controller that is one of multiple PCIe controllers on the enhanced PCIe endpoint device may be needed to support the workload. In other embodiments (and/or at certain other times), multiple connections between host processors and the PCIe controllers on the enhanced PCIe endpoint device may be needed to support the workload. In another example, a system designer may decide to make only one such connection in order to generate a system with the lowest cost possible, or may decide to make two or more such connections in order to create (or configure) a more optimized system. In some embodiments, it may be possible to switch between a mode in which multiple PCIe interfaces are supported and a mode in which only one PCIe interface is supported.

Figure 7:
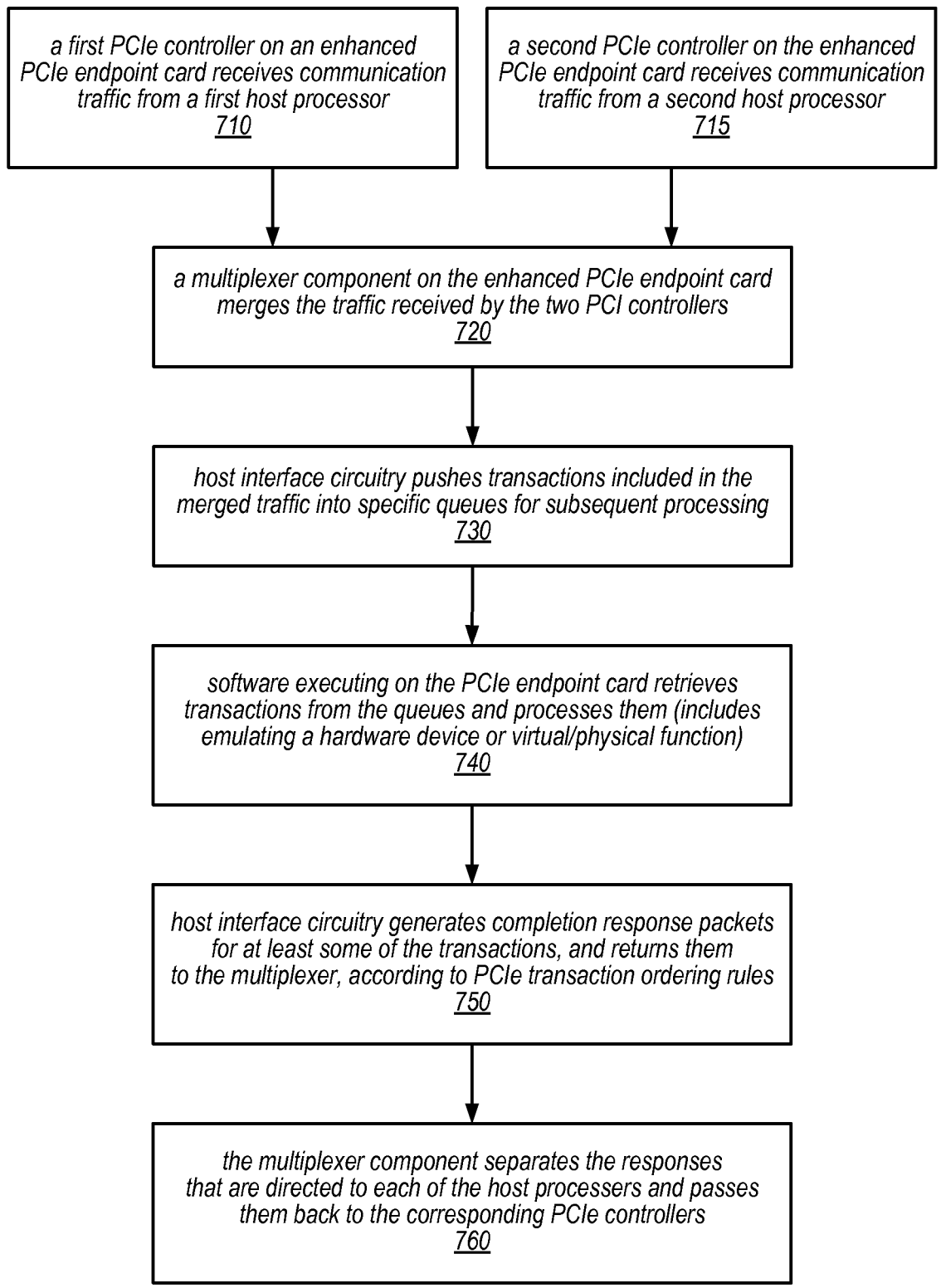
FIG. 7 is a flow diagram illustrating one embodiment of a method for handling communication traffic (e.g., PCIe traffic) on an enhanced PCIe device that presents multiple PCIe endpoints.

One embodiment of a method for handling communication traffic (e.g., PCIe traffic) on an enhanced PCIe device that presents multiple PCIe endpoints is illustrated by the flow diagram in FIG. 7. As illustrated at 710 and 715, in this example, the method may include a first PCIe controller on an enhanced PCIe endpoint card receiving communication traffic from a first host processor and a second PCIe controller on the enhanced PCIe endpoint card receiving communication traffic from a second host processor. For example, PCIe controllers on the enhanced PCIe endpoint card may receive transaction layer packets from each of the host processors that include transactions directed to emulated hardware devices or virtual/physical functions thereof As illustrated in this example, the method may include a multiplexer component on the enhanced PCIe endpoint card (e.g., a hardware circuit that implements a multiplexing function, or a multiplexer component implemented in software or using a combination of hardware and software) merging the traffic received by the two PCI controllers, as in 720. In some embodiments, the multiplexer component may be configured to merge incoming traffic on the enhanced PCIe endpoint card and to separate outgoing traffic that is directed back to the host processors through the PCIe controllers. The method may also include host interface circuitry on the enhanced PCIe endpoint card pushing transactions that were included in the merged traffic into specific queues for subsequent processing, as in 730. For example, the transactions may be pushed into particular ones of multiple transaction ring buffers (such as ring buffers 474-476 in FIG. 4 or ring buffers 674-676 in FIGS. 6A and 6B) that are instantiated in memory on the enhanced PCIe endpoint card, where the particular ring buffers into which each transaction is pushed may be dependent on a software-definable mapping of various transaction-related parameter values (e.g., tuples of addresses, routing identifiers and transaction classes, or other combinations of parameter values) to specific transaction ring buffers, as described herein.

As illustrated in FIG. 7, the method may include software executing on the PCIe endpoint card retrieving each of the transactions from the queues and processing it, which may include emulating a hardware device or virtual/physical function (as in 740). As described herein, there may be some flexibility in the order in which transactions are processed on the enhanced PCIe endpoint card, based on the workload or on various scheduling polices. As illustrated in this example, the method may include host interface circuitry (e.g., a response processor component of a host interface module) generating completion response packets for at least some of the transactions, and returning them to the multiplexer component, according to PCIe transaction ordering rules (as in 750). The method may also include the multiplexer component separating the responses that are directed to each of the host processers and passing them back to the corresponding PCIe controllers, from which they may be returned to the host processors (as in 760).

Note that in embodiments in which there are multiple host interface circuitry components that precede a single multiplexer component on the enhanced PCIe endpoint card (such as the embodiment illustrated in FIG. 6B), the operations shown in elements 720 and 730 in FIG. 7 and the operations shown in elements 750 and 760 in FIG. 7 may be reversed. For example, in response to a first PCIe controller on an enhanced PCIe endpoint card receiving communication traffic from a first host processor, the first PCIe controller may route that communication traffic (as transaction layer packets) to a first host interface circuit component for processing, and the first host interface circuit component may then pass the resulting communication traffic (as transaction layer packets) to the multiplexer component. Meanwhile, in response to a second PCIe controller on the enhanced PCIe endpoint card receiving communication traffic from a second host processor, the second PCIe controller may route that communication traffic (as transaction layer packets) to a second host interface circuit component for processing, and the second host interface circuit component may then pass the resulting communication traffic (as transaction layer packets) to the multiplexer component. Communication traffic from the two host interface circuitry components to the endpoint memory may then be merged by the single multiplexer component before being communicated to the endpoint memory. Subsequent to the received transactions being processed (as in 740), the multiplexer component may separate any communication returned from the processing of the transactions and direct it to the host interface circuitry component that is coupled to the PCIe controller through which the corresponding transaction was received from one of the host processers. Each of the host interface circuitry components (e.g., or response processor components) may generate completion response packets for at least some of the transactions, and return them to the corresponding PCIe controllers, according to PCIe transaction ordering rules, from which they may be returned to the host processors In some embodiments, rather than connecting each of multiple bus/interface controllers (such as PCIe controllers) on an enhanced multi-channel endpoint device to a respective processor socket on a host computing system, each of the bus/interface controllers may be connected to a host server SOC (e.g., an SOC that implements a relatively low-power, low-performance, and/or low-cost sever). In such embodiments, the enhanced multi-channel endpoint device may be connected to (and exchange communication traffic with) multiple independent servers, and the enhanced multi-channel endpoint device may include a multiplexer component that is configured to merge the traffic that is received from those servers by the corresponding bus/interface controllers. Note that in this use case, the host computing system may benefit from jitter reduction and also from cost, power and/or parts reductions (e.g., through the consolidation of functionality), with the logic to support multiple interfaces being located in the enhanced multi-channel endpoint device, and the cost of the enhanced multi-channel endpoint device being amortized over multiple host server SOCs. In various embodiments, either third generation PCIe interfaces (e.g., PCIe Gen3 x4, x8, or x16 interfaces) or Ethernet interfaces (e.g., 10 or 25 Gb interfaces) may be used as the interconnect for communication traffic exchanged between the enhanced bus/interface controller and the host server SOCs (e.g., one to four such SOCs in a host computing system).

Figure 8:
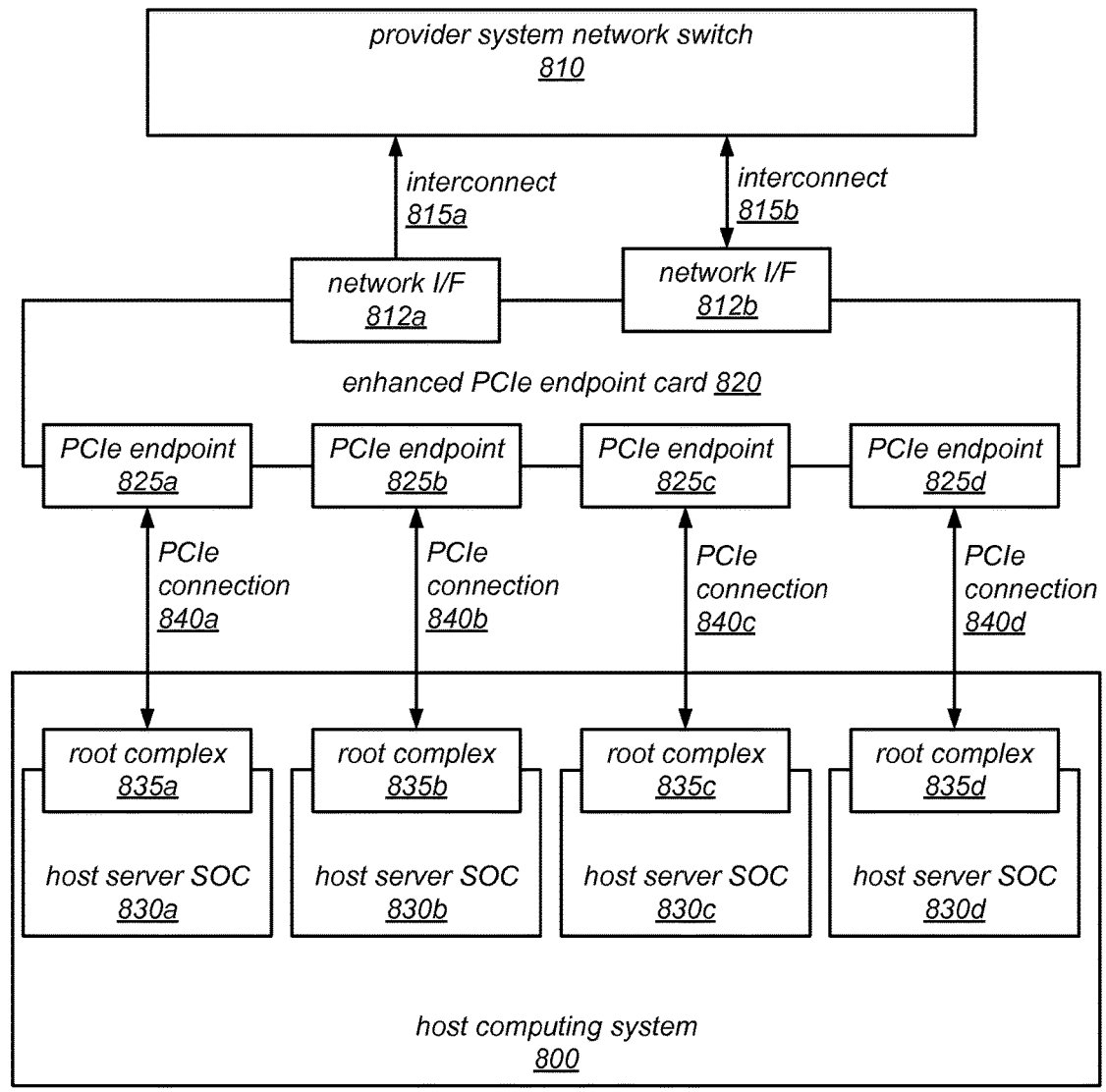
FIG. 8 is a block diagram illustrating the relationships between an enhanced PCIe endpoint in a service provider system, multiple host server SOCs of the service provider system, and a service provider network switch, according to at an embodiment in which the enhanced PCIe endpoint exposes multiple endpoints to the host server SOCs.

FIG. 8 is a block diagram illustrating the relationships between an enhanced PCIe endpoint in a service provider system, multiple host server SOCs of the service provider system, and a service provider network switch, according to at an embodiment in which the enhanced PCIe endpoint exposes multiple endpoints to the host server SOCs. In other words, in the example embodiment illustrated in FIG. 8, the enhanced PCIe endpoint 820 may have the ability to expose PCIe interfaces to multiple provider system host processors on host server SOCs to minimize latency and jitter effects of relaying the traffic directed to one provider system host processor (or host server SOC) through another provider system host processor (or host server SOC). In this example, a provider system network switch 810 is coupled to an enhanced PCIe endpoint 820 (e.g., a PCIe card in a data center of a service provider that provides virtualized computing and storage services) through one of two network interfaces 812a and 812b over interconnects 815a and 815b (e.g., multiple Ethernet connections). In some embodiments, traffic from any of the components of enhanced PCIe endpoint card 820 (including any of the host interface modules) or exchanged on behalf of any of the components of enhanced PCIe endpoint card 820 (including any of the emulated hardware devices) may be exchanged through either of the two network interfaces 812a and 812b over the corresponding interconnect 815. In other embodiments, communication traffic that originates from particular components or is exchanged on behalf of particular components may be exchanged through a particular one of the two network interfaces 812a and 812b over the corresponding interconnect 815 (e.g., according to a hardware or software mapping between the components and network interfaces). In this example, each of the four PCIe endpoints exposed by the enhanced PCIe endpoint card 820 (shown as PCIe endpoints 825a-825d) is coupled to a respective one of four host server SOCs 830a-830d (e.g., one of multiple host server SOCs on the motherboard in the service provider system, which is illustrated in FIG. 8 as host computing system 800), or, more specifically to a root complex 835 on one of the host server SOCs 830.

In this example, each of the host server SOCs 830a-830d presents its own PCIe root complex (shown as 835a-835d). For example, host server SOC 830a exposes PCIe root complex 835a, which is coupled to PCIe endpoint 825a over PCIe connection 840a, host server SOC 830b exposes PCIe root complex 835b, which is coupled to PCIe endpoint 825b over PCIe connection 840b, and so on. In some embodiments, various pairs of the host server SOCs on host computing system 800 may be coupled to each other through a direct connection (e.g., over a point-to-point processor interconnect or another type of point-to-point interconnect), and each of the host server SOCs may route communication traffic to other ones of the host server SOCs over that connection. In other embodiments, communication traffic between the host server SOCs on host computing system 800 may be exchanged over one or more shared interconnects (e.g., various local or system busses on the motherboard of host computing system 800).

In some embodiments, the provider system network switch 810 may serve to connect the enhanced PCIe endpoint 820 (or a network interface thereof) to other networks (e.g., to the public Internet or to an intermediate network) and/or to other networked devices in the provider's data center (e.g., to the next level data center routers that, eventually, connect together all of the other servers, or racks thereof, in the data center).

In some embodiments, the PCIe connections between the PCIe endpoints 825 on enhanced PCIe endpoint card 820 and the host server SOCs 830 on host computing system 800 may be third generation PCIe interfaces (e.g., PCIe Gen3 x4, x8, or 16 interfaces, depending upon bandwidth, cost, and/or power considerations) and the PCIe controllers on enhanced PCIe endpoint 820 may be dual-mode (root complex and endpoint) controllers. In some embodiments, enhanced PCIe endpoint 820 and/or its host interface(s) may be configured to be software extensible such that a wide range of different devices and physical functions thereof may be realized in software. Note that while the example enhanced PCIe endpoint devices illustrated in FIGS. 4, 6A and 6B present two PCIe endpoints (e.g., through two PCIe endpoint controllers), and the example enhanced PCIe endpoint device illustrated in FIG. 8 presents four PCIe endpoints (e.g., through four PCIe endpoint controllers), in other embodiments, an enhanced PCIe endpoint device that includes functionality similar to that of these example enhanced PCIe endpoint devices may include any other number of PCIe endpoint controllers and/or may present any other number of PCIe endpoints to host processors or host server SOCs. Similarly, while these example enhanced PCIe endpoint devices include one or two network interfaces through which the example enhanced PCIe endpoint devices communicate with other networked devices, an enhanced PCIe endpoint device may provide any number of such network interfaces, in different embodiments. Note also that, while the enhanced multi-channel endpoint card illustrated in FIG. 8 (or, more specifically, the bus/interface controllers thereof) communicates with multiple host server SOCs over a PCIe connection, in other embodiments, an enhanced multi-channel endpoint card may communicate with multiple host servers over an Ethernet interconnect (not shown).

Note that while the enhanced PCIe endpoint devices described herein may support individual connections to multiple hosts, they may not be implemented according to a typical PCIe MR-IOV (multi-root I/O virtualization) use case. Note that, to date, MR-IOV has not achieved industry acceptance, and is very complex to implement. In some embodiments, the enhanced PCIe endpoint devices described herein may avoid the MR-IOV path in that the host processors (e.g., stand-alone single core or multi-core processors, or processors on host server SOCs) may present (and see) its own independent root complex, and may separately enumerate the PCIe tree. In such embodiments, the traffic may be merged on the enhanced PCIe endpoint devices, and may be unified through one or more upward facing Ethernet links to a network switch (e.g., one that serves to connect the enhanced PCIe endpoint device to other networks and/or to other networked devices, such as next level routers that, eventually, connect together other servers, or racks thereof, of a service provider environment).

In some embodiments, the operating system of the host computing system may be aware of (and keep track of) what is running on each processor socket (and on each processor core of each socket) and may steer (or bias) the PCIe communications that originate at each processor socket or core toward the particular one of the PCIe interfaces (endpoints) to which the socket is physically connected. In some embodiments, this may eliminate (or reduce) the need to route PCIe traffic from one socket through another socket in order to direct it to a PCIe interface (endpoint) that is associated with the target of the PCIe traffic on the enhanced PCIe endpoint device. For example, in some embodiments, the physical and virtual functions of the emulated hardware devices that are supported on the enhanced PCIe endpoint device may be mapped to a particular one of the PCIe controllers on the enhanced PCIe endpoint device. In some such embodiments, only transactions that originate from the processor socket to which a particular PCIe endpoint on the enhanced PCIe endpoint card is physically connected can be routed to the physical and virtual functions that are mapped to that PCIe controller. In other embodiments, transactions that originate from any of the processor sockets (or processor cores thereof) may be directed to any of the supported physical and virtual functions. However, PCIe traffic that originates from a processor socket other than the one to which a particular PCIe controller on the enhanced PCIe endpoint card is physically connected may be routed to the physical and virtual functions that are mapped to that PCIe controller through the processor socket that is physically connected to that PCIe controller (thus incurring additional hops and/or delays, and experiencing decreased performance when compared to traffic that is not routed through another processor socket). In some embodiments, the operating system (or a hypervisor) may be configured to manage PCIe traffic for multiple tenants of a multi-tenant computing system such that a tenant process that accesses a particular emulated PCIe device (or a function thereof) is executing on the processor socket that is physically (directly) connected to the PCIe controller that supports that emulated PCIe device. Note that in other embodiments, traffic may be routed through any of the PCIe controllers on behalf any of the emulated devices (or functions thereof). In other words, there may be no fixed mapping between the emulated devices (or functions thereof) and the PCIe controllers on the enhanced PCIe endpoint card.

As previously noted, in some embodiments of the enhanced PCIe endpoint devices described herein, one or more DMA engines may be instantiated for each device class for which emulation is supported. In some embodiments, each PCIe endpoint controller may also include a built-in or semi-dedicated DMA. Thus, in some embodiments of the enhanced PCIe endpoint device architecture, there may be separate DMA engines for each PCIe controller and also for each emulated device.

In some embodiments, during a system startup or configuration operation, each of the processors of a host computing system may perform an operation to discover any available PCIe interfaces. For example, during such a discovery operation, a host processor may discover multiple PCIe interfaces (endpoints) of an enhanced multi-channel PCIe endpoint device. These PCIe interfaces may appear to the host processor as if they are PCIe interfaces from two separate and distinct endpoint devices (e.g., two different PCIe cards) even though they are actually exposed by a single PCIe endpoint device. In this example, it will appear to each of the processors as if they were communicating with a locally attached PCIe card.

Note that from the perspective of processes executing on the host processors, the PCIe topology may be enumerated in a table (e.g., according to the Advanced Configuration and Power Interface, or ACPI, specification) which may also include the NUMA topology of the PCIe bus. In some embodiments, logically speaking, each root complex may appear as a separate PCIe domain and that would be described in the ACPI table. In such embodiments, system software executing on the host computing system may have all the information it needs in order to determine which of the multiple PCIe domains is associated with each NUMA node.

Figure 9:
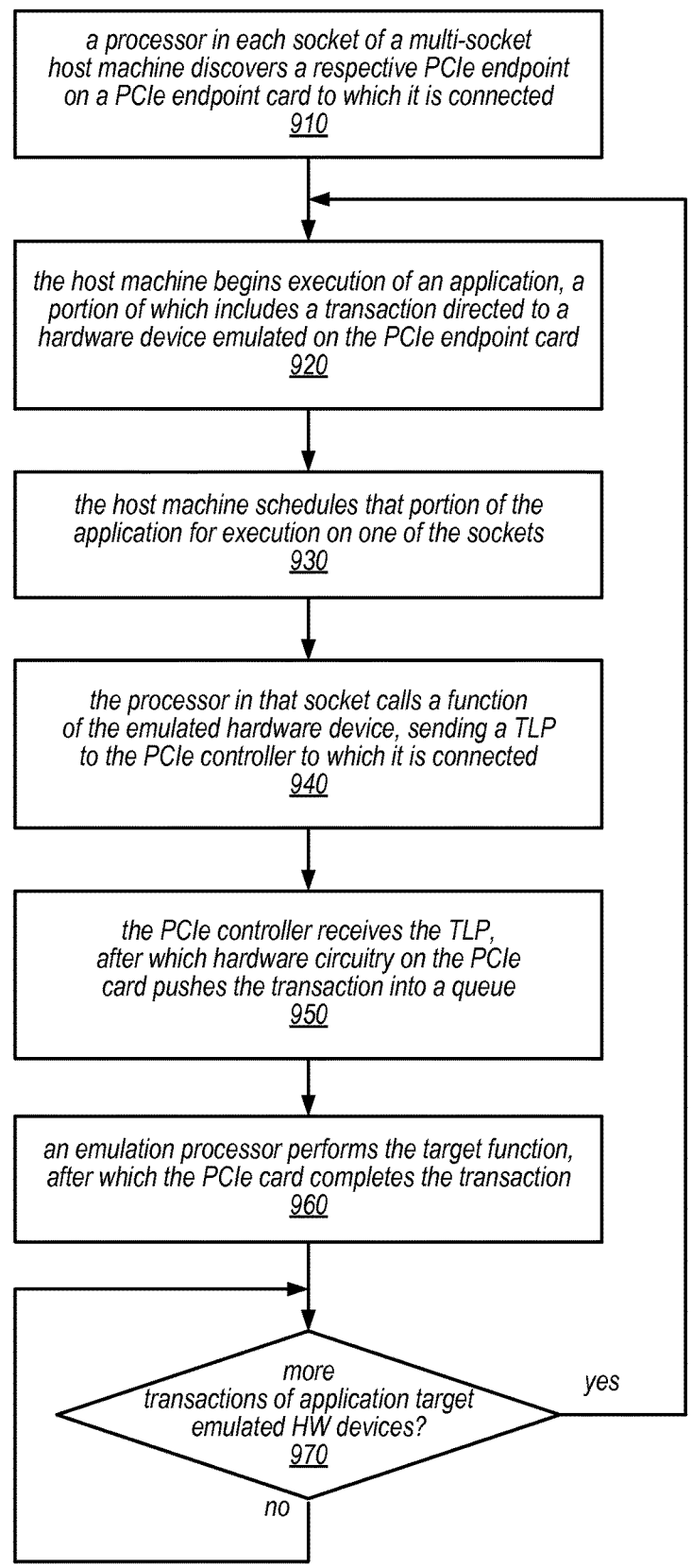
FIG. 9 is a flow diagram illustrating one embodiment of a method for managing communication traffic (e.g., PCIe traffic) directed to an enhanced PCIe endpoint device that presents multiple endpoints to a host computing system.

One embodiment of a method for managing communication traffic (e.g., PCIe traffic) that is directed to an enhanced PCIe endpoint device that presents multiple endpoints to a host computing system is illustrated by the flow diagram in FIG. 9. As illustrated at 910, in this example, the method may include a processor in each socket of a multi-socket host machine (e.g., a host machine in which each of the sockets presents its own PCIe root complex) discovering a respective PCIe endpoint on a PCIe endpoint card to which it is connected. For example, the processor may discover that a particular one of two or more PCIe controllers on the PCIe endpoint card is physically connected to the processor. In some embodiments, the PCIe controller may be physically connected to the processor through a connector on the PCIe endpoint card that is inserted into a PCIe expansion slot on the host machine. In some embodiments, the processor may be hardwired to the PCIe expansion slot (e.g., by traces on a printed circuit board, or through any of a variety of jumper wires, connectors, or cables).

As illustrated in this example, the method may include the host machine beginning execution of an application, a portion of which includes a transaction that is directed to a hardware device that is emulated on the PCIe endpoint card (as in 920). The method may include the host machine scheduling that portion of the application (e.g., a particular thread) for execution on one of the sockets (as in 930). For example, in various embodiments, the thread may be scheduled for execution on one of the sockets that was selected randomly or according to a load balancing policy. In other embodiments, each of the multiple PCIe controllers on the card may be responsible for receiving and/or otherwise handling traffic that is directed to particular emulated devices or functions. In such an embodiment, the thread may be scheduled for execution on the socket for which the corresponding PCIe controller is responsible for receiving and/or handling traffic directed to the emulated hardware device targeted by the transaction. As illustrated in FIG. 9, the method may include the processor in that socket calling a function of the emulated hardware device, which may include sending a transaction layer packet to the PCIe controller to which it is connected (as in 940).

As illustrated in this example, the method may include the PCIe controller receiving the transaction layer packet, after which hardware circuitry on the PCIe card pushes the transaction into a queue on the PCIe card (e.g., a transaction ring buffer), as in 950. The method may also include an emulation processor on the PCIe card performing the target function, after which the PCIe card completes the transaction, as in 960. As illustrated in FIG. 9, the method may include repeating the operations illustrated at 920-960 when and if any additional transactions of the application are received that target the emulated HW devices. This is illustrated in FIG. 9 by the feedback from the negative exit of 970 to its input and from the positive exit of 970 to 920.

As noted above, in some embodiments, each processor socket in a multi-socket host computing system may be hard-wired (and/or hard-coded) to direct PCIe communication traffic to a particular one of multiple PCIe expansion slots of the host computing system. For example, in some embodiments, the underlying platform (e.g., a physical motherboard or other printed circuit board of the host computing system) may include one PCIe expansion slot that is physically connected to one of the processor sockets (e.g., through traces on the printed circuit board) and another PCIe expansion slot that is physically connected to another one of the processor sockets. In some embodiments, (e.g., depending on the particular hardware platform), the system firmware (e.g., the system BIOS) may have some ability to probe which one of the processor sockets is physically connected to each one of the PCIe expansion slots. In other words, in some embodiments the physical connections between processor sockets and PCIe expansion slots (and the knowledge thereof) may be hard-coded, while in other embodiments it may be discoverable. In some embodiments an interface that is compliant with the ACPI specification may (from a system software perspective) hide (or abstract away) the exact mechanism by which these connections are made and made known. In some such embodiments, the operating system may not know (or need to know) the true underlying mechanism for doing the enumeration. Instead, this information may be presented to the operating system by the firmware. For example, ACPI-compliant firmware may present tables to the operating system (e.g., tables that are hard-coded in the system or that are filled in through a discovery process, in different embodiments) indicating the connections between processor sockets and PCIe expansion slots, and the operating system may read those tables in order to determine the particular ones of the processor sockets (or processor cores thereof) on which to schedule various applications, processes or threads for execution.

As previously noted, in a typical multi-socket computing system, a given PCIe connector is connected to just one of the processor sockets. For example, in a system that includes a north bridge (or host bridge) device (and in which the north bridge is the primary PCIe component controller on the host computing system), this component may actually be part of the processor socket. In such embodiments, in order to physically wire a PCI port to a host controller, the PCIe controller may literally be wired to a processor socket (e.g., to pins that expose the functionality of the north bridge). As described herein, in some embodiments an enhanced PCIe endpoint card may present multiple PCIe endpoints to multiple host processors in order to form connections with those processors. There are many different ways that the two PCIe endpoints can be physically connected to different host processor sockets without having to route traffic through a single host processor socket that is the only one connected to the enhanced PCIe endpoint card, including, but not limited to, those described herein. For example, in some embodiments, rather than the enhanced PCIe endpoint card plugging into a single PCIe expansion slot (as is generally the case with PCIe cards), the printed circuit board for the enhanced PCIe endpoint card may be designed such that it has two physical connectors that are arranged on the enhanced PCIe endpoint card in such a way that they can be plugged into adjacent PCIe expansion slots in the host computing system (e.g., on the motherboard of the host computing system), as a dual-slot port. In such embodiments, each of the two physical connectors would thus be individually wired to one of the processor sockets. In such embodiments, an endpoint SOC (such as endpoint 480 illustrated in FIG. 4, endpoint SOC 680 illustrated in FIG. 6A, or endpoint SOC 695 in FIG. 6B) may be integrated onto the enhanced PCIe endpoint card, and may be configured to merge and/or otherwise manage the communication traffic that is received from the two processor sockets through the two physical connectors to process transactions that are directed to devices (or function thereof) that are emulated on the enhanced PCIe endpoint card.

Figure 10A:
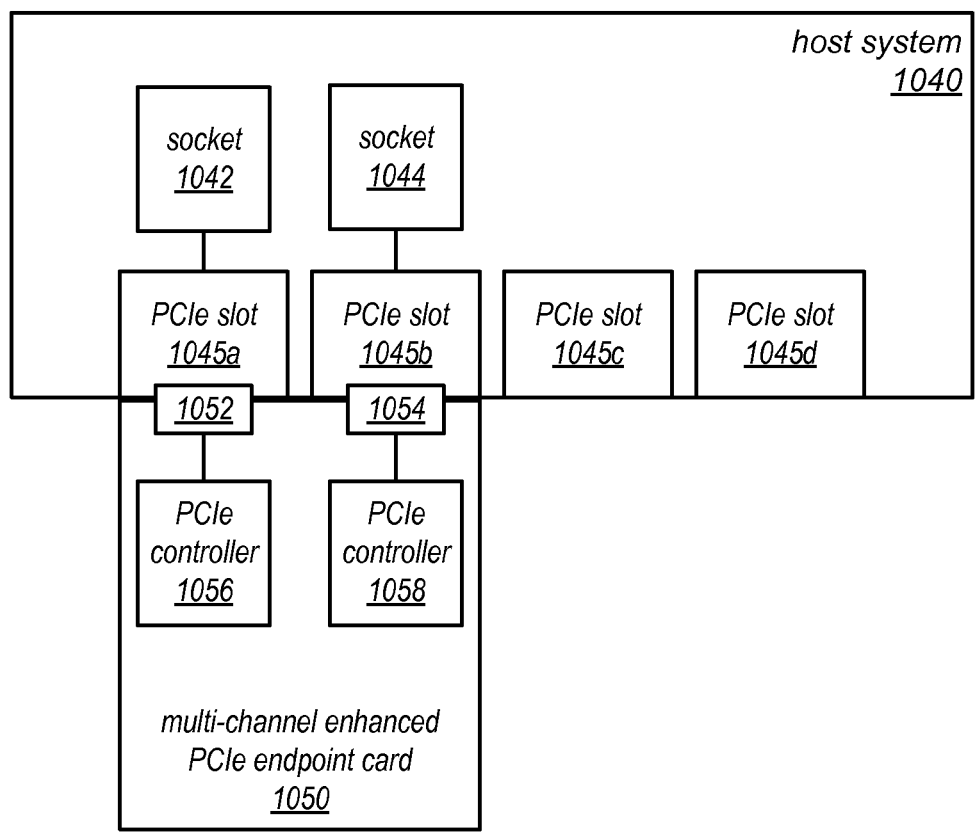
FIG. 10A is a block diagram illustrating one embodiment of a system in which an enhanced PCIe endpoint card exposes multiple independent PCIe connectors that plug into adjacent PCIe expansion slots on the host machine.

FIG. 10A is a block diagram illustrating one embodiment of a system in which an enhanced PCIe endpoint card (e.g., a non-standard, multi-channel PCIe card) exposes multiple independent PCIe connectors that plug into adjacent PCIe expansion slots on the host machine (e.g., on the motherboard of the host machine) to connect to independent in-line PCIe channels from different processor sockets. Note that in some embodiments, the independent PCIe channels going to various ones of the processor sockets may not necessarily be of the same width. In this example, host system 1040 includes four PCIe expansion slots (1045a-1045d), two of which are connected to processor sockets. Specifically, socket 1042 is connected to PCIe expansion slot 1045a and socket 1042 is connected to PCIe expansion slot 1045b. In this example, a multi-channel enhanced PCIe endpoint card 1050 exposes two connectors (1052 and 1054) through which the multi-channel enhanced PCIe endpoint card 1050 is physically connected to PCIe expansion slots 1045a and 1045b, respectively. Through these connections, multi-channel enhanced PCIe endpoint card 1050 presents two separate and distinct PCIe endpoints to host system 1040. Specifically, multi-channel enhanced PCIe endpoint card 1050 exposes PCIe controller 1056 to socket 1042 through connector 1052 and PCIe expansion slot 1045*a*, and exposes PCIe controller 1058 to socket 1044 through connector 1054 and PCIe expansion slot 1045*b*.

In another example architecture for providing an enhanced multi-channel PCIe endpoint device, an endpoint SOC (such as endpoint 480 illustrated in FIG. 4, endpoint SOC 680 illustrated in FIG. 6A, or endpoint SOC 695 in FIG. 6B) may be integrated onto the enhanced PCIe endpoint card, and may be configured route one PCIe channel through a single PCIe connector on the enhanced PCIe endpoint card to a processor socket on the host system, and to route one or more other PCIe channels to respective processor sockets on the host system using a corresponding number of PCIe cable adapters. For example, such an embodiment may include one or more PCIe x4 or x8 host and target adapters that a bridge for PCIe traffic over a cable.

Figure 10B:
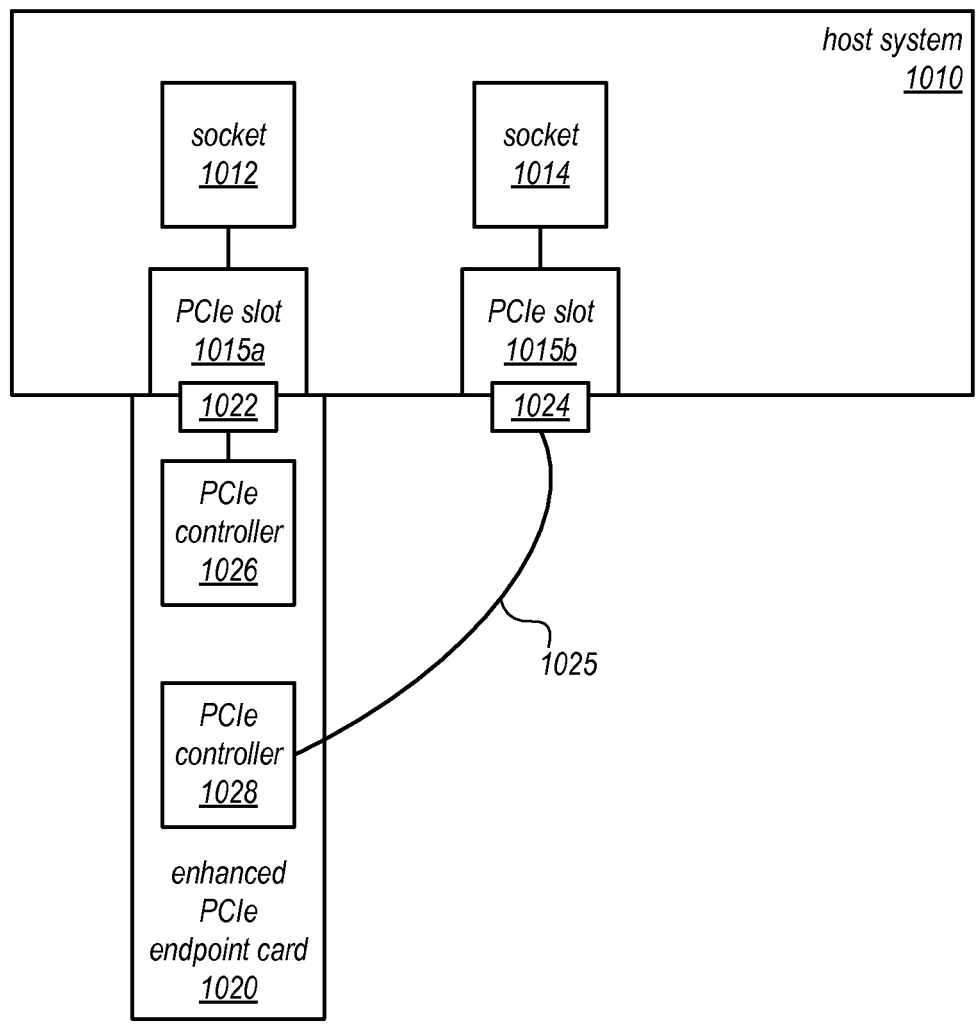
FIG. 10B is a block diagram illustrating one embodiment of a system in which an enhanced PCIe endpoint card exposes one PCIe connector that plugs into a PCIe expansion slot on the host machine and an adapter cable to connect to another PCIe expansion slot on the host machine.

FIG. 10B is a block diagram illustrating one embodiment of a system in which an enhanced PCIe endpoint card exposes one PCIe connector that plugs into a PCIe expansion slot on the host machine (e.g., on the motherboard of the host machine) and an adapter cable to connect to another PCIe expansion slot on the host machine. In this example, host system 1010 includes at least two PCIe expansion slots (1015*a* and 1045), each of which is connected to a respective processor socket. Specifically, socket 1012 is connected to PCIe expansion slot 1015*a* and socket 104 is connected to PCIe expansion slot 1015*b*. In this example, a multi-channel enhanced PCIe endpoint card 1020 exposes connector 1022 (which is a component physically located on multi-channel enhanced PCIe endpoint card 1020), through which the multi-channel enhanced PCIe endpoint card 1020 is physically connected to PCIe expansion slot 1015*a*. The multi-channel enhanced PCIe endpoint card 1020 also presents an adapter 1024 (which is connected to multi-channel enhanced PCIe endpoint card 1020 by cable 1025), through which the multi-channel enhanced PCIe endpoint card 1020 is physically connected to PCIe expansion slot 1015*b*. Through these connections, multi-channel enhanced PCIe endpoint card 1020 presents two separate and distinct PCIe endpoints to host system 1010. Specifically, multi-channel enhanced PCIe endpoint card 1020 exposes PCIe controller 1026 to socket 102 through connector 1022 and PCIe expansion slot 1015*a*, and exposes PCIe controller 1028 to socket 1014 through adapter 1024 and PCIe expansion slot 1015*b*.

In some embodiments, rather than using a cable to connect a second PCIe controller (and expose a corresponding second PCIe endpoint) to a second processor socket, other types of jumpers or connectors (e.g., copper wire PCI connectors) may be used to make a connection from the enhanced PCIe endpoint card and a PCIe port to which the second processor socket is physically connected. In still other embodiments, an endpoint SOC (such as endpoint 480 illustrated in FIG. 4, endpoint SOC 680 illustrated in FIG. 6A, or endpoint SOC 695 in FIG. 6B) may be integrated onto the enhanced PCIe endpoint card, and may be configured route one PCIe channel through a single PCIe connector on the enhanced PCIe endpoint card to a processor socket on the host system, and to route one or more other PCIe channels to respective processor sockets on the host system through system panel connectors over system panel (or other) cables.

In some embodiments, some or all of the functionality of the enhanced PCIe endpoint devices described herein (e.g., the functionality of the components that make up an endpoint SOC, such as endpoint SOC 480 in FIG. 4, endpoint SOC 680 in FIG. 6A, or endpoint SOC 695 in FIG. 6B) may be integrated into the host computing system itself, rather than on a separate PCIe card. For example, in one embodiment, an endpoint SOC such as endpoint SOC 480 in FIG. 4, endpoint SOC 680 in FIG. 6A, or endpoint SOC 695 in FIG. 6B may be located on the motherboard of the host computing system (or on another printed circuit board on which host processors or processor sockets are located). In such embodiments, multiple PCIe interfaces exposed by the endpoint SOC (e.g., through multiple PCIe controllers on the endpoint SOC) may be wired to one or more of the processors (or sockets) over different PCIe channels (e.g., separate sets of PCIe bus traces going to each of the processors/sockets). In such embodiments, as in embodiments in which the PCIe controllers and other components of the endpoint SOC are located on a separate PCIe card, the PCIe controllers may be physically connected to two separate PCIe busses and may present a unified interface to both. A variety of other architectural approaches may be employed to provide the functionality of the enhanced PCIe endpoint devices described herein and to present multiple PCIe interfaces (and endpoints) to multiple processor sockets or processor cores in a host computing system using techniques similar to those described here, in different embodiments.

Note that while several specific examples of enhanced PCIe endpoint devices are described herein in which the enhanced PCIe endpoint devices emulate physical peripheral devices, the techniques described herein for reducing latency and jitter that might otherwise be caused by dynamic queuing effects of various links and buffers in the relay path when a processor socket that is not directly connected to a particular PCIe endpoint must relay PCIe traffic to the PCIe endpoint through a processor socket that is directly connected to the PCIe endpoint may be applicable in other contexts. For example, in some embodiments, an enhanced PCIe endpoint card may present multiple PCIe endpoints to multiple host processors in order to provide access to functionality that is implemented directly on the PCIe endpoint card (e.g., a PCIe endpoint card on which a PCIe storage device or network processor is implemented in hardware or in any combination of hardware and software), rather than being emulated on the PCIe endpoint card.

Figure 11:
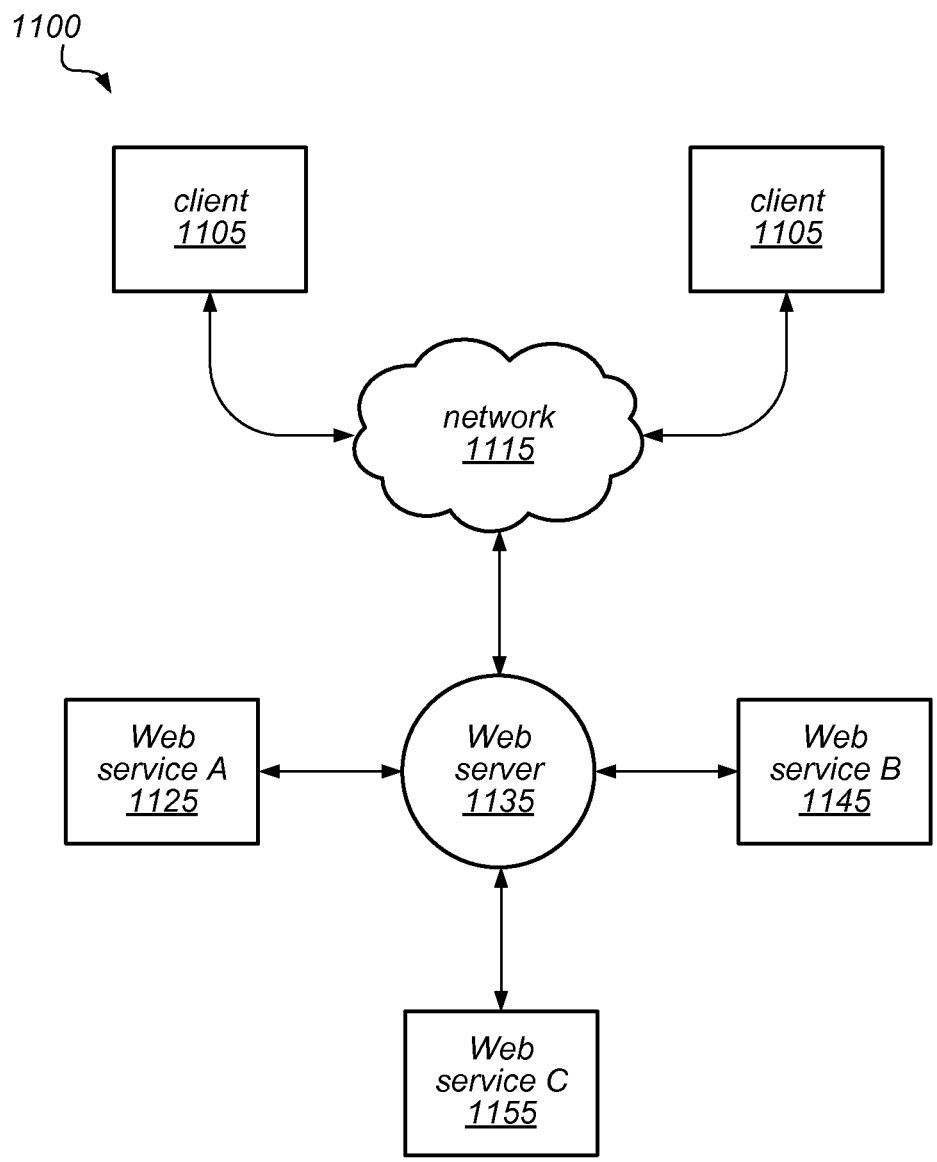
FIG. 11 is a block diagram illustrating one embodiment of a system that provides various Web-based services to clients.

Various techniques described herein for using enhanced PCIe endpoint devices (including enhanced PCIe endpoint devices that expose multiple PCIe endpoints to host processors) to accelerate the emulation of PCIe compliant hardware devices and/or to reduce latency and jitter that might otherwise be caused by relaying PCIe traffic from one processor socket through another processor socket that is directly connected to the PCIe endpoint may be employed in local or remote computing systems. This may include systems that provide services to users (e.g., subscribers) over the Internet or over other public or private networks, such as virtual private networks and connections to services in a virtual private cloud (VPC) environment. FIG. 11 illustrates a block diagram of a system that provides various Web-based services to clients, according to one embodiment. In this example, system 1100 includes one or more clients 1105. In this example, the clients 1105 may be configured to interact with a Web server 1135 via a communication network 1115.

As illustrated in this example, the Web server 1135 may be configured to process requests from clients 1105 for various services, such as Web service A (1125), Web service B (1145), and Web service C (1155), and to return results to the clients 1105. Each of the web services may provide clients with one or more of: computational resources, database services, data storage services (e.g., maintaining data in one or more tables on behalf of a client), or any other types of services or shared resources.

Figure 12:
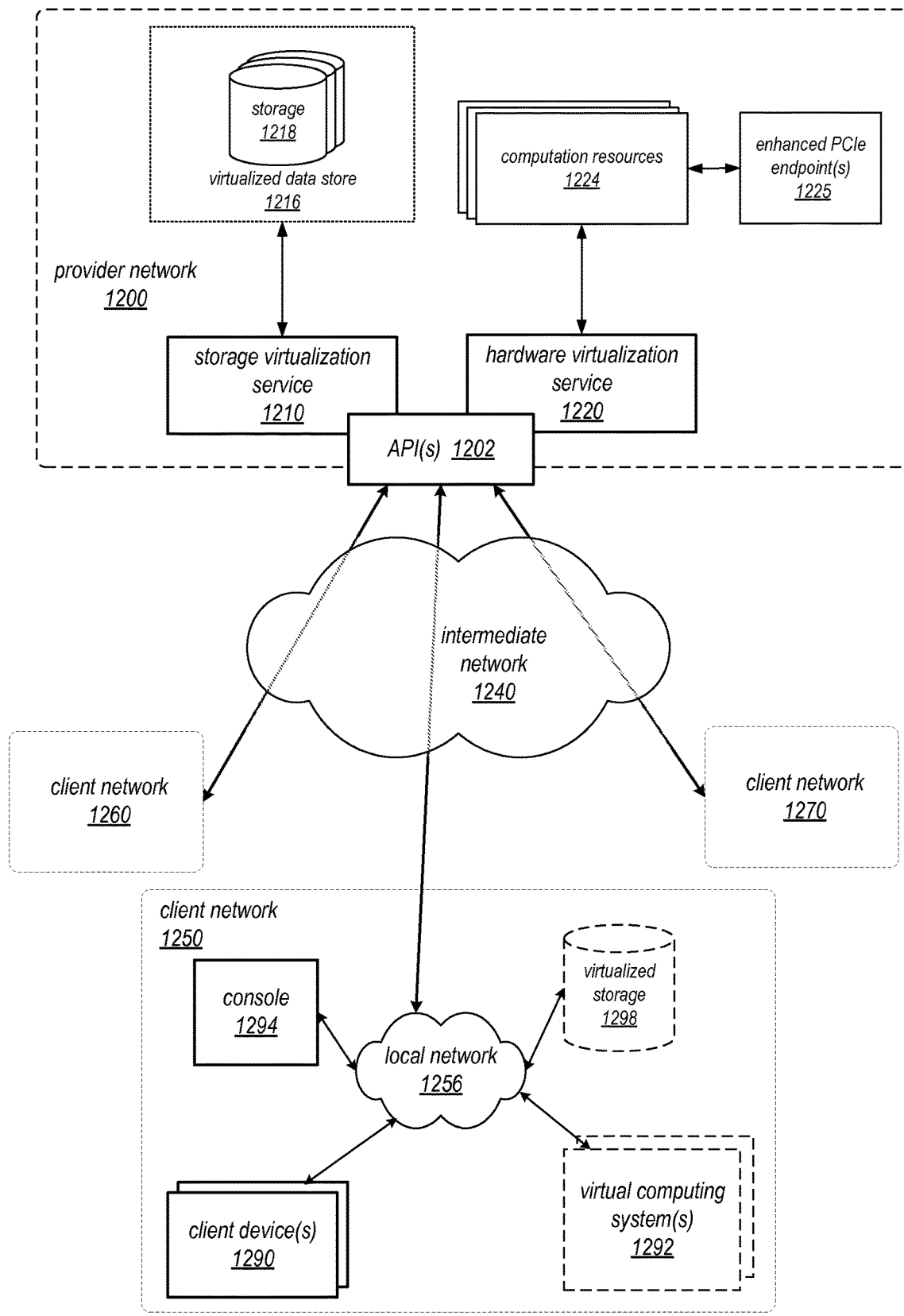
FIG. 12 is a block diagram illustrating an example provider network environment in which the apparatus and techniques described herein are used to accelerate multi-device emulation, according to at least some embodiments.

FIG. 12 is a block diagram illustrating an example provider network environment in which the techniques described herein for using enhanced PCIe endpoint devices (including multi-channel PCIe endpoint devices) to accelerate the emulation of PCIe compliant hardware devices and/or to reduce latency and jitter for PCIe traffic may be employed, according to at least some embodiments. In this example, the provider network environment 1200 provides a storage virtualization service and a hardware virtualization service to clients. In this example, hardware virtualization service 1220 provides multiple computation resources 1224 (e.g., host processors executing one or more VMs) to clients. The computation resources 1224 may, for example, be rented or leased to clients of the provider network 1200 (e.g., to a client that implements client network 1250, client network 1260, and/or client network 1270) in order to implement various applications. Each computation resource 1224 may be provided with one or more private IP addresses. Provider network 1200 may be configured to route packets from the private IP addresses of the computation resources 1224 to public Internet destinations, and from public Internet sources to the computation resources 1224. As illustrated in this example, in some embodiments, the service provider network may also include one or more enhanced PCIe endpoints 1225 (which may be similar to enhanced PCIe endpoint 420 illustrated in FIG. 4, enhanced PCIe endpoint 620 illustrated in FIG. 6A, enhanced PCIe endpoint 625 illustrated in FIG. 6B, and/or any of the other enhanced PCIe endpoints illustrated in the drawings and/or described herein). For example, enhanced PCIe endpoints 1225 may include one or more PCIe cards that are configured to emulate physical and/or virtual functions of PCIe compliant devices for the benefit of service subscribers and to present one or multiple PCIe endpoints to one or more host processors to provide access to those emulated functions. In some embodiments, enhanced PCIe endpoints 1225 may include one or more PCIe cards that present multiple PCIe endpoints to multiple host processors in order to provide access to functionality that is implemented directly on the PCIe cards, rather than being emulated on the PCIe cards (e.g., PCIe cards that implement a PCIe storage device or network processor).

Provider network 1200 may provide a client network (e.g., client network 1250, 1260, or 1270 coupled to intermediate network 1240 via local network 1256) the ability to implement virtual computing systems 1292 via hardware virtualization service 1220 coupled to intermediate network 1240 and to provider network 1200. Note that, in some embodiments, the virtual computing systems 1292 implemented on behalf of service subscribers may include virtual PCIe compliant devices, which are emulated on the enhanced PCIe endpoint card(s) 1225. Note also that in some embodiments, each of client networks 1260 and 1270 may include elements that are similar to corresponding elements of client network 1250 (not shown) and may provide functionality similar to that of client network 1250, while in other embodiments, client network 1260 and/or 1270 may include more, fewer, or different elements than those illustrated in FIG. 12 as being part of client network 1250 and/or may provide functionality that is different from that of client network 1250. In some embodiments, hardware virtualization service 1220 may provide one or more APIs 1202, for example a web services interface, via which a client network 1250, 1260, or 1270 may access functionality provided by the hardware virtualization service 1220 via a console such as console 1294. In at least some embodiments, at the provider network 1200, each virtual computing system at a client network (e.g., a virtual computing system 1292 at client network 1250) may correspond to computation resources 1224 and/or enhanced PCIe endpoints 1225 that are leased, rented, or otherwise provided to the client network.

In this example, from an instance of a virtual computing system 1292 and/or another client device 1290 or console 1294 of a client network 1250, 1260, or 1270, a client may access the functionality of storage virtualization service 1210, for example via one or more APIs 1202, to access data from and store data to a virtual data store 1216 provided by the provider network 1200. In some embodiments, a virtualized data store gateway (not shown) may be provided at the client network (e.g., at client network 1250, 1260, or 1270) that may locally cache at least some data, for example frequently accessed or critical data, and that may communicate with storage virtualization service 1210 via one or more communications channels to upload new or modified data from a local cache so that the primary store of data (virtualized data store 1216) is maintained. In at least some embodiments, a user, via a virtual computing system 1292 and/or on another client device 1290, may mount and access one or more storage volumes 1218 of virtual data store 1216, each of which appears to the user as local virtualized storage 1298.

Figure 13:
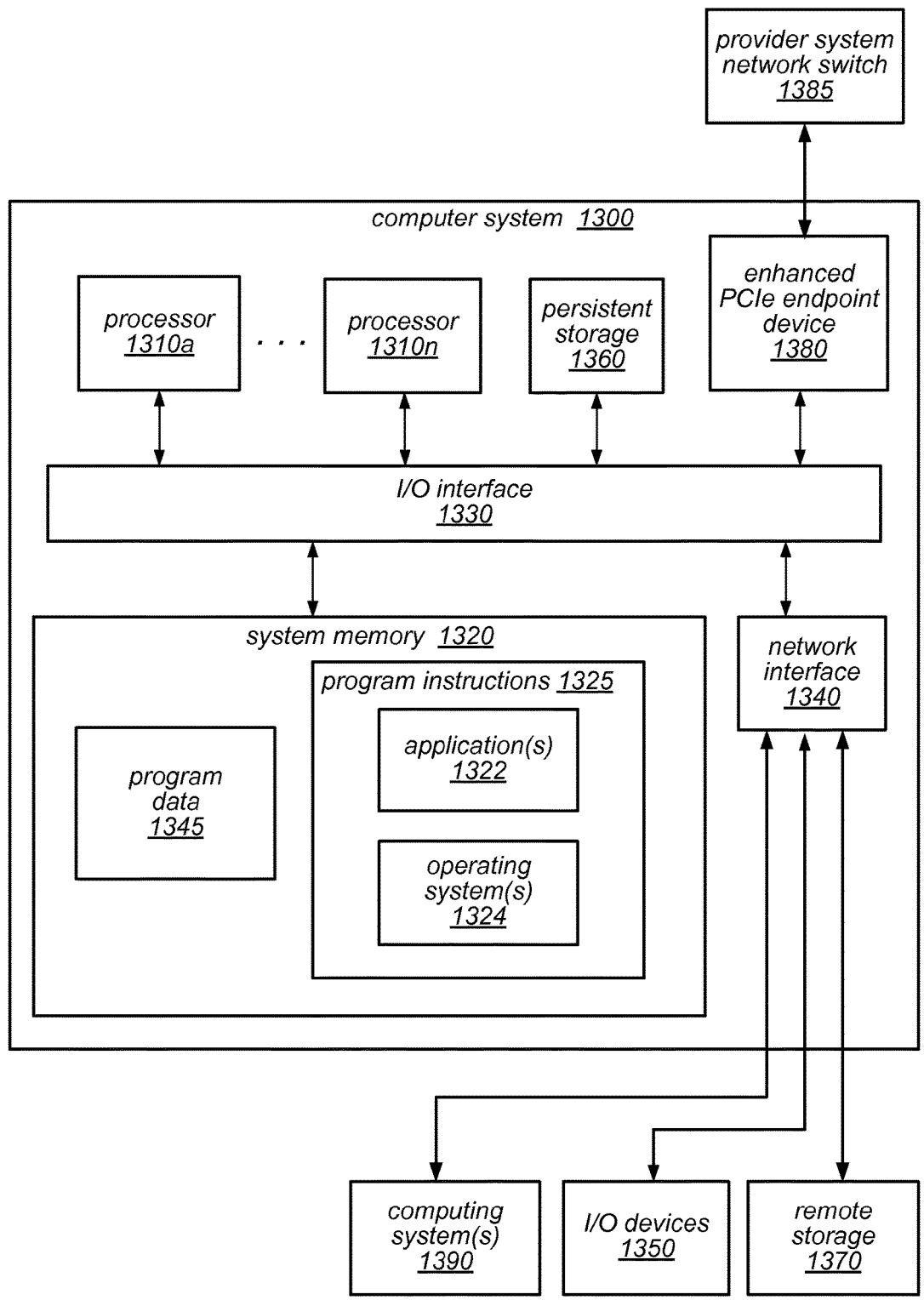
FIG. 13 is a block diagram illustrating a computer system configured to implement the techniques described herein, according to various embodiments.

The methods described herein may in various embodiments be implemented by any combination of hardware and/or software. For example, in one embodiment, the methods may be implemented by one or more computer systems, each of which includes a processor executing program instructions stored on a computer-readable storage medium coupled to the processor. The program instructions may be configured to implement at least some of the functionality described herein for using an enhanced PCIe endpoint to accelerate the emulation of PCIe compliant hardware devices (and/or to reduce latency and jitter for PCIe traffic) and to present one or multiple PCIe endpoints to one or more host processors to provide access to those emulated devices (or to various virtual/physical functions thereof). FIG. 13 is a block diagram illustrating a computer system configured to implement at least a portion of the techniques described herein, according to various embodiments. Computer system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. Note that computer system 1300 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein. In some embodiments, computer system 1300 may be an enhanced PCIe endpoint device on which any number of PCIe compliant hardware devices are emulated on behalf of virtualized computing service clients.

Computer system 1300 includes one or more processors 1310 (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose, special-purpose, or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g. Internet, LAN, etc.). For example, a client application executing on system 1300 may use network interface 1340 to communicate with a server application executing on a single server or on a cluster of servers that implement a distributed system. In another example, an instance of a server application executing on computer system 1300 may use network interface 1340 to communicate with a client application and/or with other instances of the server application that may be implemented on other computer systems.

In the illustrated embodiment, computer system 1300 also includes one or more persistent storage devices 1360. In various embodiments, persistent storage devices 1360 may correspond to disk drives, tape drives, solid state memory, other mass storage devices, or any other persistent storage device. Computer system 1300 (or an application, software component, or operating system operating thereon) may store instructions and/or data in persistent storage devices 1360, as desired, and may retrieve the stored instruction and/or data as needed. Computer system 1300 also includes enhanced PCIe endpoint device 1380, which may be similar to enhanced PCIe endpoint 420 illustrated in FIG. 4, enhanced PCIe endpoint 620 illustrated in FIG. 6A, enhanced PCIe endpoint 625 illustrated in FIG. 6B, and/or any other enhanced PCIe endpoint devices or cards described herein. For example, enhanced PCIe endpoint device 1380 may include may include an endpoint SOC (such as endpoint SOC 480 in FIG. 4, endpoint SOC 680 in FIG. 6A, or endpoint SOC 695 in FIG. 6B), which includes a network interface, one or more PCIe endpoint controllers, an emulation processor, host interface circuitry (such as any of the host interface modules 460 illustrated in FIG. 4, host interface modules 660 illustrated in FIG. 6A, or host interface modules 665 illustrated in FIG. 6B), a multiplexer component, a request processor, host interface steering logic, a response processor, multiple transaction ring buffer CSRs and transaction ring buffer pointers, endpoint memory (such as endpoint memory 470 in FIG. 4 or endpoint memory 670 in FIGS. 6A and 6B), which may store emulation code and/or include (instantiated within memory 470 or 670) multiple transaction ring buffers, an SOC memory, which may include (instantiated within the SOC memory) multiple transaction ring buffers, and/or any other circuitry suitable to support using an enhanced PCIe endpoint to accelerate the emulation of PCIe compliant hardware devices (and/or to reduce latency and jitter for PCIe traffic) and to present one or more PCIe endpoints to a host processor, as described herein.

As illustrated in FIG. 13, a network interface of enhanced PCIe endpoint device 1380 may communicate with other networks and/or networked devices through provider system network switch 1385. For example, in some embodiments, provider system network switch 1385 may serve to connect the enhanced PCIe endpoint device 1380 (or a network interface thereof) to other networks (e.g., to the public Internet or to an intermediate network) and/or to other networked devices in a provider's data center (e.g., to the next level data center routers that, eventually, connect together all of the other servers, or racks thereof, in the data center).

Computer system 1300 includes one or more system memories 1320 that are configured to store instructions and data accessible by processor 1310. In various embodiments, system memories 1320 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement at least a portion of the methods and techniques described herein for using an enhanced PCIe endpoint to accelerate the emulation of PCIe compliant hardware devices and/or to reduce latency and jitter for PCIe traffic. In various embodiments, program instructions 1325 (and/or program instructions within any emulation code stored in memory on enhanced PCIe endpoint device 1380) may be encoded in platform native binary, any interpreted language such as Java™ byte-code, or in any other language such as C/C++, Java™, etc., or in any combination thereof. For example, in the illustrated embodiment, program instructions 1325 include program instructions executable to implement one or more application(s) 1322 (which may include various configuration modules, not shown), and/or operating system(s) 1324, which may include or be implemented as a hypervisor or virtual machine monitor, or any of various operating systems, such as UNIX, LINUX, Solaris™, MacOS™, Windows™, etc.

Note that in various embodiments, some or all of system memory 1310 (including some or all of program instructions 1325, and/or program data 1345) may be implemented within shared physical memory pages in a stand-alone computing system or in a system that provides virtualized resources to clients, as described herein.

Any or all of program instructions 1325, including application(s) 1322, configuration module(s), emulation code stored in memory on enhanced PCIe endpoint device 1380, and/or operating system(s) 1324, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include storage for program data 1345. In various embodiments, system memory 1320 (e.g., program data 1345 within system memory 1320) and/or remote storage 1370 may store various configuration parameter values or other information usable in implementing the methods and techniques described herein.

In one embodiment, I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In various embodiments, I/O interface 1330 may include support for devices attached through one or more types of peripheral buses, such as a variant of the Peripheral Component Interconnect (PCI) bus standard, the Peripheral Component Interconnect Express (PCIe) bus standard, or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems 1390 (which may implement one or more server nodes and/or clients of a distributed system, such as a host server or host processor thereof), for example. In addition, network interface 1340 may be configured to allow communication between computer system 1300 and various I/O devices 1350 and/or remote storage 1370. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated in FIG. 13 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   two host processors; and
   an enhanced Peripheral Component Interconnect Express (PCIe) endpoint device;
   wherein the enhanced PCIe endpoint device comprises:
      an emulation processor;
      two PCIe controllers;
      multiplexer circuitry; and
      a memory, comprising program instructions that when executed by the emulation processor emulate one or more hardware devices that are compliant with the PCIe standard;
   wherein the enhanced PCIe endpoint device presents two PCIe interfaces to the two host processors through the two PCIe controllers, each of which is physically connected to a respective one of the two host processors;
   wherein in response to receipt, by the two PCIe controllers from the two host processors, of communication traffic that is directed to at least one of the one or more emulated hardware devices:
      each of the PCIe controllers is configured to pass the communication traffic received from the respective one of the two host processors to which it is physically connected to the multiplexer circuitry;
      the multiplexer circuitry is configured to merge the communication traffic it receives from the two PCIe controllers; and
      the enhanced PCIe endpoint device is configured to process the merged communication traffic, wherein to process the merged communication traffic, the endpoint emulation processor is configured to execute a portion of the program instructions to emulate the at least one of the one or more emulated hardware devices to which the merged communication traffic is directed.

2. The system of claim 1, wherein at least a portion of the communication traffic received by each of the two PCIe interfaces originates from the host processor that is physically connected to the other one of the two PCIe interfaces.

3. The system of claim 1, wherein communication traffic generated by processes or threads running on each of the two host processors is directed to the one of the two PCIe controllers to which the host processor is physically connected.

4. The system of claim 1, wherein each of the two host processors is a single core or multi-core processor in a different processor socket in a host computing system.

5. The system of claim 1, wherein each of the two host processors is a component of a respective host server system-on-chip (SOC) device.

6. An apparatus, comprising:
two or more Peripheral Component Interconnect Express (PCIe) controllers, each of which is physically coupled to a respective host processor, and each of which presents a respective PCIe interface to its respective host processor;
an emulation processor; and
a memory, comprising program instructions that when executed on the emulation processor emulate one or more hardware devices that are compliant with the PCIe standard;
wherein in response to receipt, by the two or more PCIe controllers, of communication traffic that is directed to at least one of the one or more emulated hardware devices, the apparatus is configured to process the received communication traffic;
wherein to process the received communication traffic, the emulation processor is configured to execute a portion of the program instructions to emulate the at least one of the one or more emulated hardware devices to which the received communication traffic is directed.

7. The apparatus of claim 6,
wherein the apparatus further comprises a multiplexer component; and
wherein, prior to the emulation processor executing a portion of the program instructions, the multiplexer component is configured to merge the communication traffic received by the two or more PCIe controllers for subsequent processing.

8. The apparatus of claim 6,
wherein the one or more emulated hardware devices comprises a plurality of emulated hardware devices; and
wherein each of the two or more PCIe controllers is configured to handle communication traffic that is directed to particular ones of the plurality of emulated hardware devices.

9. The apparatus of claim 6,
wherein the communication traffic comprises one or more transactions that are directed to the at least one of the one or more emulated hardware devices;
wherein the apparatus further comprises a multiplexer component; and
wherein, for each of the one or more transactions for which response communication traffic is generated:
the multiplexer component is configured to return the response communication traffic to the one of the PCIe controllers from which the communication traffic comprising the transaction was received; and
the one of the PCIe controllers from which the communication traffic comprising the transaction was received is configured to return the response communication traffic to the respective host processor from which the transaction originated.

10. The apparatus of claim 6, wherein the two or more PCIe controllers, the emulation processor, and the memory are components of a system-on-chip (SOC) device on an enhanced PCIe endpoint card.

11. The apparatus of claim 6, implemented on a system-on-chip (SOC) device on a printed circuit board on which the respective host processors to which each of the two or more PCIe controllers are connected are located.

12. The apparatus of claim 6,
wherein the apparatus is implemented on an enhanced PCIe endpoint card that is connected to a host server system through two adjacent PCIe expansion slots of the host server system, wherein the host server system comprises the respective host processors to which two of the two or more PCIe controllers are physically coupled; and
wherein each of the two of the two or more PCIe controllers is physically coupled to a respective host processor through the connection made at a respective one of the two PCIe expansion slots.

13. The apparatus of claim 6,
wherein the apparatus is implemented on an enhanced PCIe endpoint card that is connected to a host server system through a single PCIe expansion slot of the host server system, wherein the host server system comprises the respective host processors to which two of the two or more PCIe controllers are physically coupled;
wherein one of the two of the two or more PCIe controllers is physically coupled to a respective host processor through the connection made at the single PCIe expansion slot; and
wherein the other one of the two of the two or more PCIe controllers is physically coupled to a respective host processor through jumper wires or an adapter cable.

14. The apparatus of claim 6, wherein the communication traffic comprises a plurality of transaction layer packets, each comprising a transaction directed to the at least one of the one or more emulated hardware devices.

15. The apparatus of claim 14,
wherein the apparatus further comprises:
one or more transaction ring buffers, each configured to store information from the plurality of transaction layer packets that comprise transactions directed to the at least one of the one or more emulated hardware devices; and
packet steering circuitry;
wherein in response to receipt, by one of the two or more PCIe controllers, of a transaction layer packet comprising a transaction that is directed to a given one of the one or more emulated hardware devices, the packet steering circuitry is configured to steer information about the transaction from the transaction layer packet to a particular one of the one or more transaction ring buffers dependent, at least in part, on a routing identifier or address associated with a targeted function of the given one of the one or more emulated hardware devices; and
wherein to process the received communication traffic, subsequent to the information about the transaction being steered to the particular one of the one or more transaction ring buffers, the emulation processor is configured to:
retrieve the information about the transaction from the particular one of the one or more transaction ring buffers; and
process the transaction included in the transaction layer packet information.

16. The apparatus of claim 6, wherein the two or more PCIe controllers and respective host processors comprises four PCIe controllers and respective host processors.

17. The apparatus of claim 6, further comprising a network interface through which components of the apparatus communicate, over a private or public network, with networked devices other than the host computing system that includes the respective host processors.

18. A method, comprising:
- receiving, by a first Peripheral Component Interconnect Express (PCIe) controller on a PCIe card, communication traffic from a first host processor to which the first PCIe controller is physically coupled, wherein the communication traffic received by the first PCIe controller includes one or more transactions to be processed on the PCIe card;
- receiving, by a second PCIe controller on the PCIe card, communication traffic from a second host processor to which the second PCIe controller is physically coupled, wherein the communication traffic received by the second PCIe controller includes one or more other transactions to be processed on the PCIe card;
- merging, by a multiplexer module on the PCIe card, the communication traffic received by the first PCIe controller and the communication traffic received by the second PCIe controller; and
- processing, on the PCIe card, the one or more transactions and the one or more other transactions that are included in the merged communication traffic.

19. The method of claim 18,
- wherein each of the one or more transactions and the one or more other transactions is directed to at least one of one or more hardware devices that are emulated on the PCIe card; and
- wherein processing the one or more transactions and the one or more other transactions comprises executing, using an emulation processor on the PCIe card, program instructions that when executed by the emulation processor cause the emulation processor to emulate the at least one of the one or more hardware devices to which each of the one or more transactions and the one or more other transactions is directed.

20. The method of claim 18,
- wherein each of the first host processor and the second host processor is a single core or multi-core processor component in a different integrated circuit device in a host computing system;
- wherein receiving communication traffic from the first host processor comprises receiving communication traffic from a first PCIe root complex; and
- wherein receiving communication traffic from the second host processor comprises receiving communication traffic from a second PCIe root complex that is separate and distinct from the first PCIe root complex.

* * * * *